(12) United States Patent
Schwaiger

(10) Patent No.: US 7,735,773 B2
(45) Date of Patent: Jun. 15, 2010

(54) AIRCRAFT

(75) Inventor: Meinhard Schwaiger, Linz (AT)

(73) Assignee: IAT 21 Innovative Aeronautics Technologies GmbH, Linz (AT)

(*) Notice: Subject to any disclaimer, the term of this patent is extended or adjusted under 35 U.S.C. 154(b) by 315 days.

(21) Appl. No.: 11/157,031

(22) Filed: Jun. 20, 2005

(65) Prior Publication Data

US 2005/0274843 A1 Dec. 15, 2005

Related U.S. Application Data

(63) Continuation-in-part of application No. PCT/AT03/00371, filed on Dec. 18, 2003.

(30) Foreign Application Priority Data

Dec. 18, 2002 (AT) ............................ A 1895/2002
May 5, 2003 (AT) ............................. A 673/2003

(51) Int. Cl.
*B64C 39/08* (2006.01)
(52) U.S. Cl. ............................... 244/9; 244/19
(58) Field of Classification Search .............. 244/9, 244/19, 20, 70, 219, 48; 440/92, 93; 416/147, 416/466, 162, 155
See application file for complete search history.

(56) References Cited

U.S. PATENT DOCUMENTS

| 1,304,187 | A | * | 5/1919 | Lind | 244/70 |
| 1,532,902 | A | * | 4/1925 | Immers | 244/9 |
| 1,567,531 | A | * | 12/1925 | Magni | 244/215 |
| 1,631,861 | A | * | 6/1927 | Hanschke | 244/9 |
| 2,034,761 | A | * | 3/1936 | King | 244/20 |
| 2,037,377 | A | * | 4/1936 | Gardner | 244/9 |
| 3,361,386 | A | | 1/1968 | Smith | |
| 4,519,562 | A | | 5/1985 | Willis | |
| 5,100,080 | A | * | 3/1992 | Servanty | 244/9 |
| 5,320,310 | A | * | 6/1994 | Mitchell | 244/219 |
| 6,007,021 | A | * | 12/1999 | Tsepenyuk | 244/9 |
| 6,016,992 | A | | 1/2000 | Kolacny | |
| 6,231,004 | B1 | | 5/2001 | Peebles | |
| 6,261,051 | B1 | | 7/2001 | Kolacny | |
| 6,845,940 | B2 | * | 1/2005 | Hashimoto | 244/9 |

FOREIGN PATENT DOCUMENTS

DE  196 34 522 A1  3/1998
WO  98/07622  2/1998

* cited by examiner

*Primary Examiner*—Tien Dinh
(74) *Attorney, Agent, or Firm*—Laurence A. Greenberg; Werner H. Stemer; Ralph E. Locher

(57) ABSTRACT

The invention relates to an aircraft comprising a fuselage and at least two substantially hollow cylindrical lifting bodies which are applied to the fuselage and comprise a plurality of rotor blades which extend over the periphery of the lifting bodies, the periphery of the lifting bodies being partially covered by at least one tail surface. The aim of the invention is to provide an aircraft with an extremely high degree of maneuverability, compact dimensions and economy of fuel. To this end, the lifting bodies are driven by at least one drive unit and respectively comprise a cylindrical axis which is substantially parallel to a longitudinal axis (1a) of the aircraft.

24 Claims, 31 Drawing Sheets

# AIRCRAFT

CROSS-REFERENCE TO RELATED APPLICATIONS

This is a continuation-in-part application of application No. PCT/AT2003/000371, filed Dec. 18, 2003; the application also claims the priority, under 35 U.S.C. §119, of Austrian patent application No. A 673/2003, filed May 5, 2003 and of Austrian patent application No. A 1895/2002, filed Dec. 18, 2002; the prior applications are herewith incorporated by reference in their entirety.

BACKGROUND OF THE INVENTION

1. Field of the Invention

The invention relates to an aircraft comprising a fuselage and at least two substantially hollow cylindrical lifting bodies which are applied to the fuselage and comprise a plurality of rotor blades extending over the periphery of the lifting body, with the periphery of the lifting body being partially covered by at least one tail surface.

Such an aircraft is especially provided with a system of special lifting bodies which are configured as rotors, having a rotary axis which is arranged substantially parallel to the longitudinal axis of the aircraft. Each rotor is provided with a certain number of airfoil-like rotor blades which are substantially arranged on two disk-like end bodies in such a way that during a full rotation of the lifting body (rotor) the central axis of the rotor blade performs a circular movement spaced from the rotary axis as the radius, and that the rotor blade can be changed individually in its position during a full rotation. A defined action of force (e.g. lifting force, lateral force) can be produced on the aircraft in every momentary position of the rotor blade.

Numerous efforts have been undertaken to combine the advantages of an aircraft with those of a helicopter. Of special interest is the property of helicopters to be able to start and land vertically or to hover in the air whenever necessary in order to rescue people or in order to fulfill special transport and mounting flight maneuvers or similar tasks. The disadvantageous aspect in current helicopters is the high technical complexity, especially in the field of rotor control and the high risk of crashes even in the case of slight contact of the rotating rotor blades with obstructions such as the tips of trees or rock walls. Especially conditions during assignments in Alpine rescue operations are exceptionally critical because on the one hand a position as close as possible to a rock wall would be required, and on the other hand the slightest collision could lead to fatal consequences. Work can therefore only proceed by observing respectively large safety margins. A further disadvantage is the high fuel consumption of helicopters, even in cruising flight.

In order to avoid such disadvantages, so-called VTOL or STOL aircraft have been developed which with respect to their configuration are principally similar to airplanes, but are equipped with the ability, through various technical measures, to be able to start and land vertically, or can at least make do with extremely short take-off and landing runways.

Such a solution has been disclosed in EP 0 918 686 A (corresponding to U.S. Pat. No. 6,231,004) for example. This specification describes an airplane comprising airfoils which are substantially formed by cross-flow rotors. It is thus possible to produce a vertically downwardly directed air stream through a respective deflection of the air stream in order to enable a vertical take-off of the aircraft. The thrust can be deflected accordingly for cruising.

The disadvantageous aspect in this known solution is on the one hand that the airfoils which are optimized for generating lift have a high air resistance, so that fuel consumption is excessively high, especially at higher flight speeds, and that the aircraft in total has a relatively large wing span. It therefore requires much space and cannot be used or only with difficulty under conditions with limited available space.

Further aircraft have been described in U.S. Pat. No. 4,519,562 A. The solution is complex and has a low efficiency, so that such a system was never accepted on the market. The rotors described in U.S. Pat. No. 6,261,051 B are also not suitable for representing an aircraft with vertical take-off capabilities that can be used in practice.

A further aircraft which generates lift by using modified cross-flow fans is disclosed in DE 196 34 522 A. Apart from the question of the proper function of such an aircraft which is not obviously clear, it also comes with the disadvantages as explained above.

A further aircraft with a cross-flow rotor as a drive element is also known from U.S. Pat. No. 6,016,992 A. A very large cross-sectional surface in the direction of flight is also obtained in this case as a result of the cross-flow rotor, and the need for space is as high as in the solutions described above.

A further known aircraft with the possibility of vertical take-off is disclosed in U.S. Pat. No. 3,361,386 A. Extremely variable airfoils are provided in this aircraft which are provided with openings for gas outlet. Fuel consumption is extremely high as a result of the system-inherent adverse efficiency of such a system.

Close to the state of the art is also the drive concept for watercraft which is known as Voith-Schneider drive. This drive system which has already been known for approximately 75 years differs substantially in such a way that the swiveling movement of the individual blades during a full rotation of the live ring occurs at a fixed kinematic ratio with respect to each other. Thrust is thus always only possible in one direction. In contrast to this, a second force component in the transversal direction can be produced by the inventive rotating lifting body, irrespective of a first force component, e.g. an evenly remaining vertical lifting component.

The present invention relates to further embodiments of VTOL aircraft which are equipped with rotating lifting bodies whose rotary axis is arranged substantially parallel to the longitudinal axis of the aircraft.

SUMMARY OF THE INVENTION

It is the object of the present invention to provide an aircraft which allows vertical take-off and vertical landing, which is capable of hovering in the air, with a mobility which allows a slow forward, backward, parallel side movement to backboard or starboard, as well as a rotary movement about the vertical axis clock-wise and counter-clockwise, and which at the same time is suitable for high cruising speeds. As a result of the chosen configuration of the outside geometrical shape of the aircraft, the transition from a hovering state to a forward movement with high cruising speed must be ensured. In particular, high fuel economy shall be achieved with a comparatively low technical complexity. A further claim relates to the fulfillment of the highest safety standards which offer the aircraft the possibility to land securely even in the case of a total failure of the drive engines. Moreover, the rotating lifting bodies are to be protected with a covering in such a way that the aircraft can also be maneuvered very close to obstructions (e.g. rock walls, walls of high-rise buildings) and that even in the case of contact of the aircraft with an obstruction a crash can securely be pre-vented as a result of the rotating elements of the lifting body which are protected against collision. The pilot is provided with a secure and collision-free exiting of the aircraft by means of an ejection seat, which also represents a further claim.

These objects are achieved in accordance with the invention in such a way that the lifting bodies are driven by at least one drive unit and each comprise a cylindrical axis which is substantially parallel to a longitudinal axis of the aircraft. Each rotor is provided with a certain number of airfoil-like rotor wings which are substantially arranged on two disk-like end bodies in such a way that during a full rotation of the lifting body (rotor) the central axis of the rotor blade performs a circular movement spaced from the rotary axis as the radius, and the rotor blade preferably can be changed individually in its position during a full rotation. A defined action of force (e.g. lifting force, lateral force) can be generated on the aircraft in every momentary position of the rotor blade. This change in the position can occur as a whole. It is also possible that the rear section of the rotor blade is swivellable independent of the front section in order to thus achieve an optimal airfoil shape in every situation.

Through a suitable choice of the configuration of the lifting bodies in the aircraft it is also ensured that the space above the cockpit is kept free, thus enabling the pilot a secure and collision-free possibility to exit the aircraft by means of an ejection seat (this is not possible in a helicopter for example).

This configuration of the lifting bodies offers a further possibility for military applications. Radar and other optical devices can also be arranged above the aircraft for reconnaissance purposes. With this aircraft it is not necessary to leave a protective terrain formation without previously detecting and evaluating the action behind such terrain formation by means of a surveillance device which is flexibly mounted on the aircraft and can be extended upwardly vertically above the hovering aircraft and can thereafter be retracted again.

The solution in accordance with the invention allows maneuvering the aircraft even at low speeds or while hovering without having to change the speed of the drive unit, because the direction and strength of the lifting forces are variably within wide margins through the control of the rotor blades. An extremely high versatility is thus achieved.

Several advantages can be achieved simultaneously by arranging the lifting bodies parallel to the fuselage. On the one hand, the lifting bodies can be provided with a relatively large diameter without increasing the cross-sectional surface to a large extent in the direction of movement, thus leading to a lower need for fuel in rapid cruising flight. On the other hand, the aircraft in accordance with the invention is provided with a highly compact configuration and thus not only requires little space in a hangar or the like, but is also extremely maneuverable. This allows landing the aircraft on wood clearings or in urban regions between buildings for example where the landing of a helicopter due to the predetermined rotor diameter would no longer be possible. Moreover, the lifting bodies configured as rotors are especially sturdy in their design and apart from the rotor blades generally do not comprise any further movable parts, so that the technical complexity remains within acceptable limits. By applying the lifting bodies close to the fuselage, the mechanical strain upon the rotor suspensions is very low, thus allowing for a respective lightweight design which contributes to fuel savings.

An especially compact arrangement of the individual components is given when the lifting bodies are arranged in the upper region of the fuselage. This additionally contributes to an especially aerodynamically favorable configuration because the intake region can be accessed by flow in a fully free manner which re-mains unobstructed by other parts of the aircraft.

A further, especially advantageous embodiment of the invention provides that the lifting bodies are driven in opposite directions by gas turbines. As in helicopters, the use of gas turbines leads to an especially advantageous ratio of output to own weight. An additional advantage over helicopters is provided by the present invention in such a way that the rotary speeds of the rotating lifting bodies are substantially higher than those of conventional helicopter rotors, so that the constructional complexity of the transmissions is reduced substantially. Depending on the size, purpose and security regulations, the two rotors can be driven by one common gas turbine or each lifting body can be provided with its own gas turbine.

The efficiency of the lifting body can especially be improved further in such a way that the rotor blades which are movably arranged in the rotor consist of at least one fixed axis and two rotor blade segments which are movable independent from each other, so that the rotor blade geometry can be adjusted at every moment in each current position optimally to the respective situation. It is thus possible to optimize the lifting forces and the lateral forces and to minimize the resistance forces.

Especially high cruising speeds can be achieved in such a way that additional propulsive units for producing a thrust for the propulsion of the aircraft are provided. It is possible and also principally adequate for lower cruising speeds that the propulsion is generated by the adjustable rotor wings of the lifting bodies, such that the aircraft is brought to a position which is lowered forwardly and a thrust force is derived from the resulting lifting force. The cruising speed is limited in this case however, so that additional propulsive units need to be used advantageously for the higher cruising speeds. They can be configured as by-pass propulsive units for example. The takeoff and landing process can be supported in such a way that the additional propulsive units are arranged in a swivellable manner. On the one hand, the lifting force can thus be increased when the propulsive jet faces vertically downwardly, and on the other hand the maneuverability can be increased in addition to a respective control of the swiveling angle.

Fuel consumption during vertical takeoff and landing and during hovering is relevantly influenced by the shifted air quantity. It is therefore especially advantageous when the lifting bodies extend over at least 40%, preferably over at least 70% of the length of the fuselage.

In this way it is possible, with a predetermined cross-sectional surface, to achieve the highest possible lifting power of the lifting bodies.

The maneuverability, especially during hovering and during takeoff and landing, can be improved in such a way that adjustable guide blades are provided in the region of the air outlet openings. At a lower cruising speeds the possibility of control by the tailplane unit is strongly limited, so that a sufficient maneuverability is obtained through the individual adjustability of the rotor blades. In order to also enable a rotation of the aircraft about a vertical axis, it is especially advantageous in this connection that the adjustable rotor blades are arranged in two paired lifting bodies running in opposite directions and each consists of two segments which can be actuated independent from each other. Further adjustable guide blades which are swivellable about a transversal axis of the aircraft allow a forward and backward movement in the hovering state which can be controlled in an especially fine manner.

It is further especially preferable when the lifting bodies are provided with an external covering as a mechanical protection of the rotor blades against a collision with a solid obstruction. This means that the covering is not only configured for receiving the bearing of the rotor shaft but is also configured in a mechanically sturdy way in order to protect the lifting body against damage when the aircraft collides with an obstruction at a low relative speed.

DESCRIPTION OF THE PREFERRED EMBODIMENTS

Figure 1:
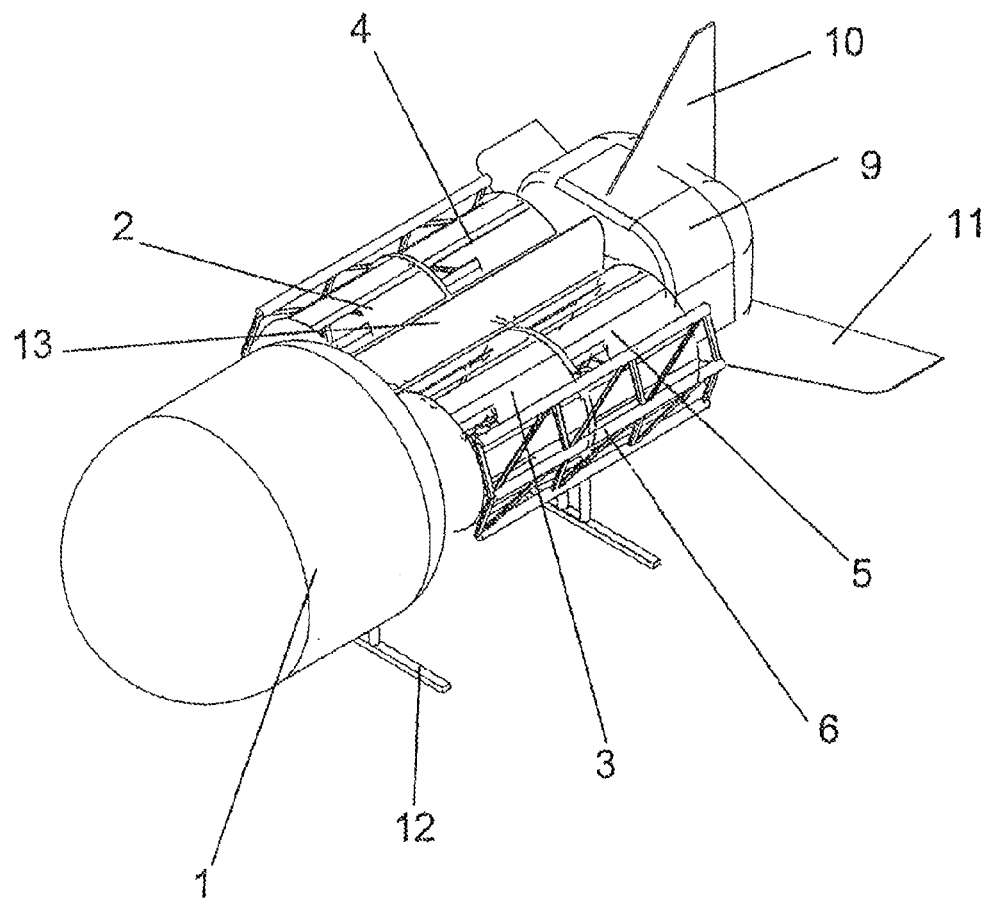
FIG. 1 shows a schematic view of a first embodiment of an aircraft in accordance with the invention in an axonometric representation.

The aircraft according to FIG. 1 to FIG. 6 consists of a fuselage 1 with a longitudinal axis 1a and of four lifting bodies 2, 3, 4 and 5 which are arranged parallel to said longitudinal axis 1a in a preferred manner above the center-of-gravity position and which are protected by a side protection means 6 against collision with a solid obstruction. In the rear section 9 there are in the known manner a horizontal tail unit 11 and a rudder unit 10, and preferably also the drive unit such as one or two gas turbines and the transmission and additional drive units (not shown here in closer detail) which are configured here as by-pass propulsive units which provide the aircraft with a high cruising speed or can support the take-off and landing process in the case of a respective pivoting configuration. Skids or similar supports 12 support the aircraft on the ground. The rear section of the aircraft is joined with the front section by means of longitudinal struts 13, 14, which have a flow-optimized cross-sectional shape or a weight-optimized framework construction. Furthermore, a stable construction for a bearing (not shown here) for the lifting bodies 2, 3, 4, 5 in the middle section is provided with the longitudinal struts and the side protection.

Figure 2:
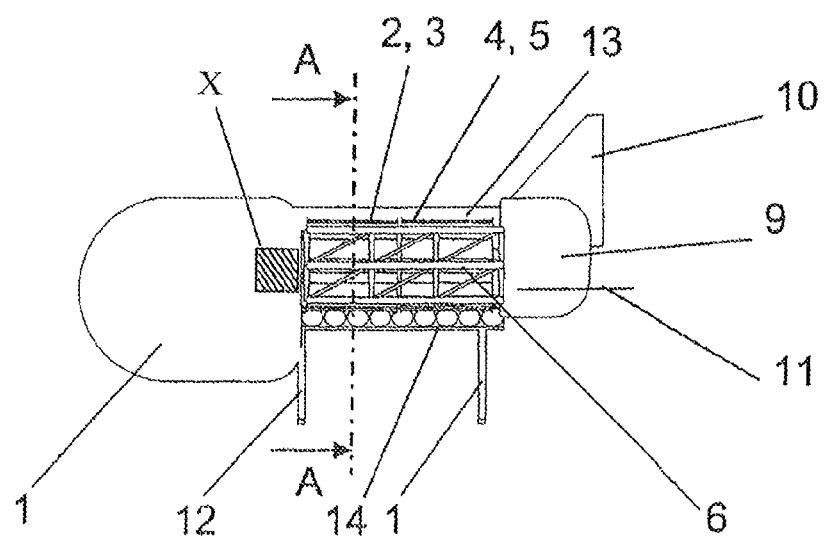
FIG. 2 shows a side view of the aircraft of FIG. 1.
Figure 3:
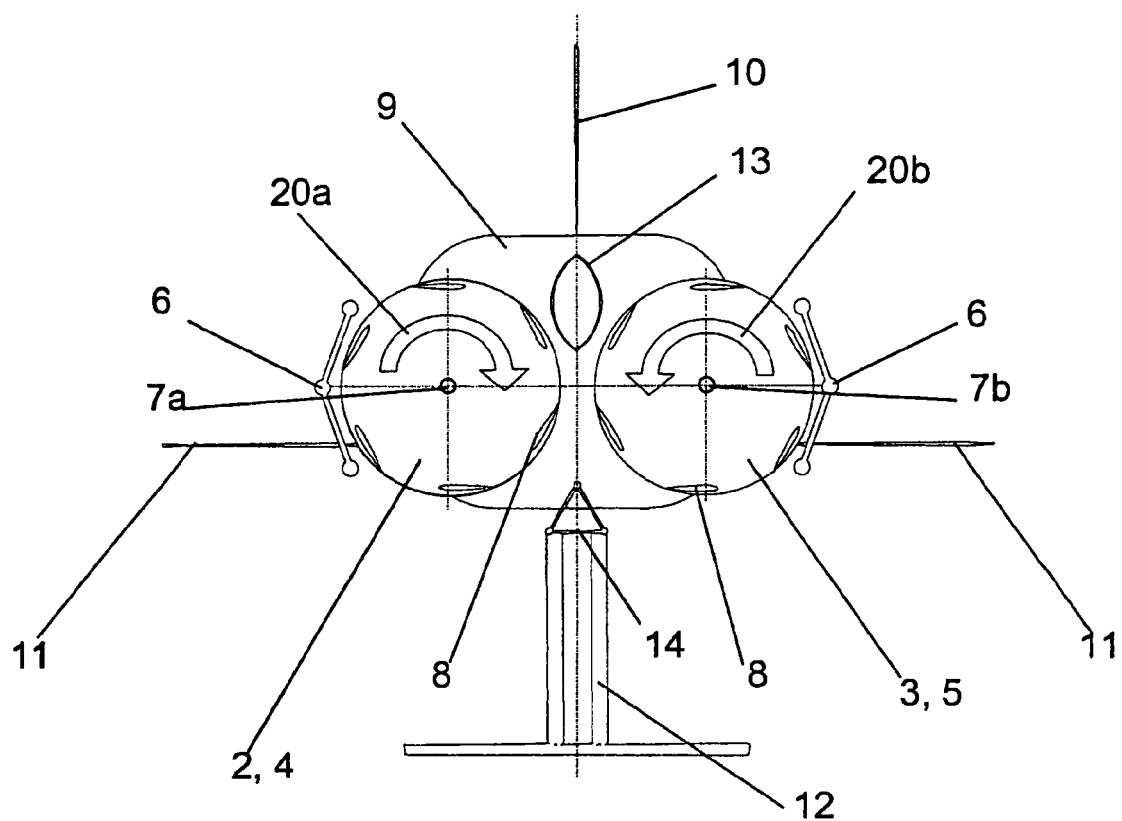
FIG. 3 shows a sectional view of the aircraft of FIG. 1 along line A-A in FIG. 2.
Figure 4:
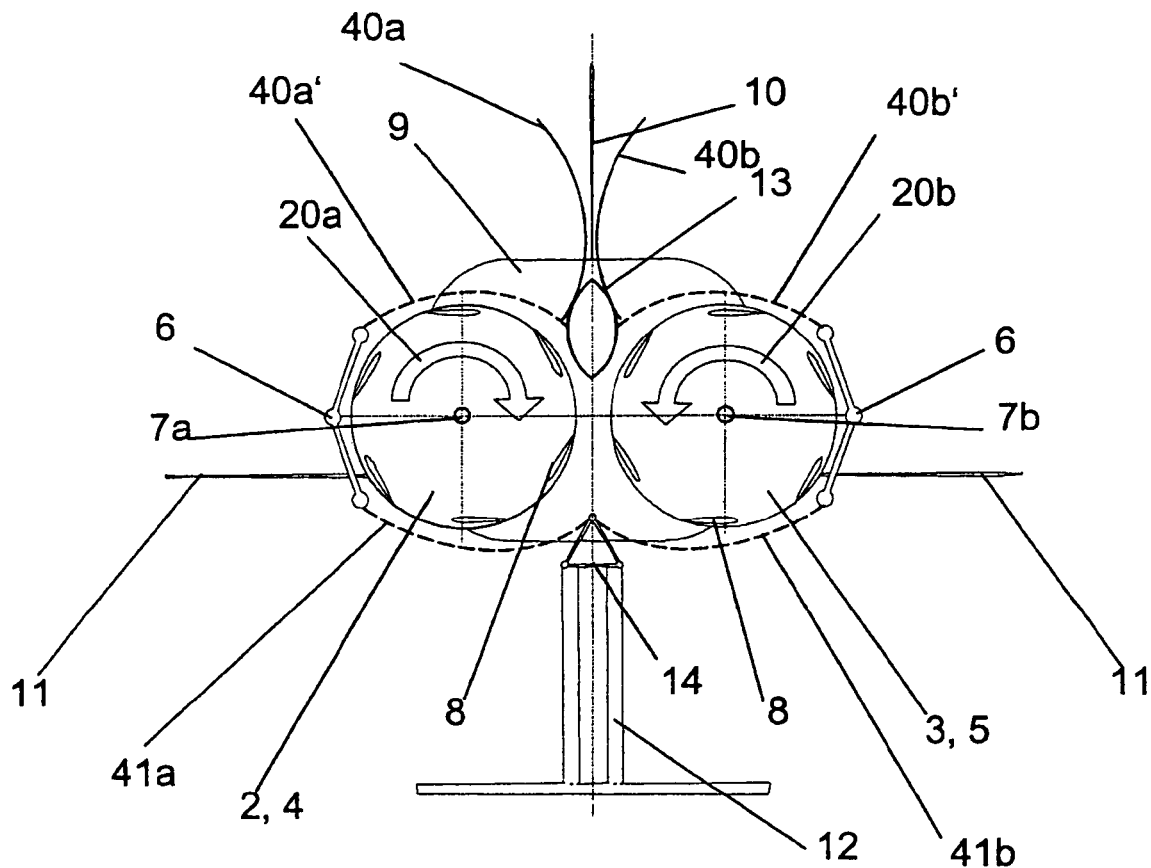
FIG. 4 shows a sectional view of the aircraft of FIG. 1 along line A-A in FIG. 2 with the illustration of an opened and closed covering of the lifting body, as is provided for high cruising speeds.
Figure 5:
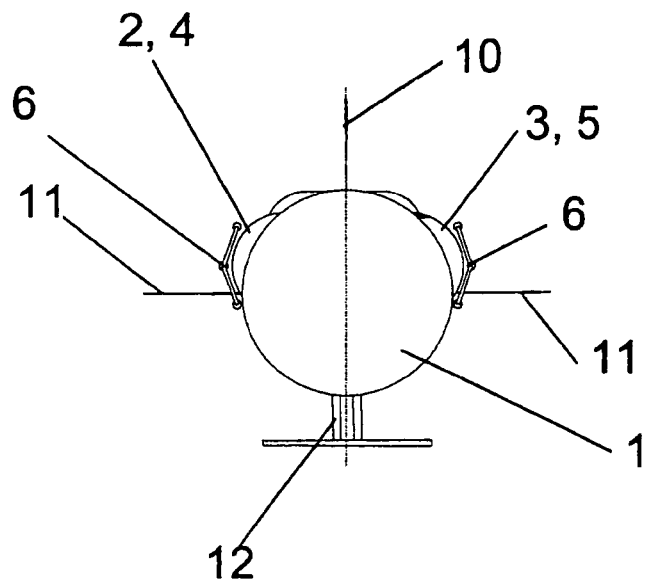
FIG. 5 shows a view of the aircraft of FIG. 1 from the front.

FIG. 2 shows the length ratios, according to which the length of the rotating lifting bodies 2, 3, 4, 5 corresponds to approximately 50%, preferably 30 to 70%, of the total length of the aircraft. FIG. 3 shows the lifting bodies 2, 3, 4, 5 with the rotary directions 20a, 20b rotating in opposite directions about the rotary axes 7a, 7B and the rotor blades 8 required for generating the lifting force. Additional drive units (not shown here in closer detail) are provided for a high cruising speed with simultaneous fuel economy. For reducing the air resistance, the lifting bodies 2, 3, 4, 5, which cannot produce the required lift at high cruising speeds, are covered by means of suitable covering skirts in a flow-optimized manner in the aircraft. In accordance with FIG. 4, these covering skirts can be arranged as compact surfaces 40a, 40b (as shown in FIG. 4 for example in the opened state for an optimal effect of the lifting bodies) or as a system of lamellae 40a', 40b', 41a', 41b' which can be set optionally as a closed covering or for an unhindered passage of the air.

Figure 7:
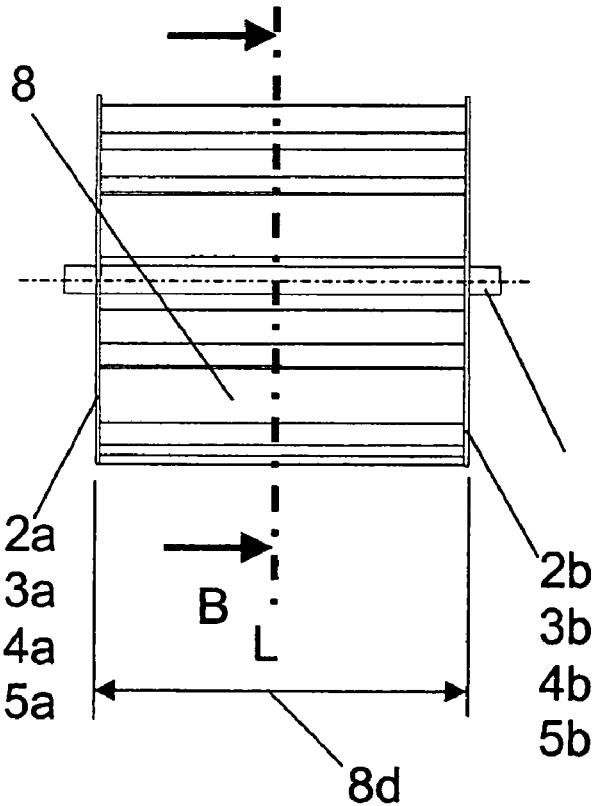
FIG. 7, FIG. 7A and FIG. 7B schematically show a lifting body of the aircraft of FIG. 1.
Figure 7A:
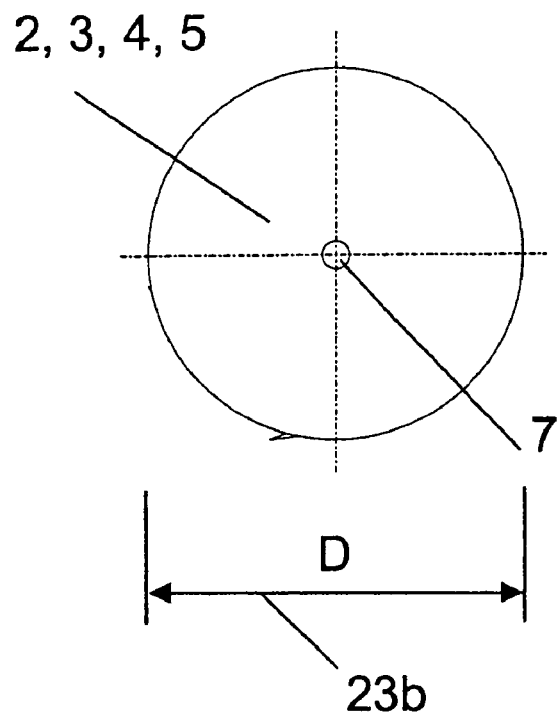
Figure 7B:
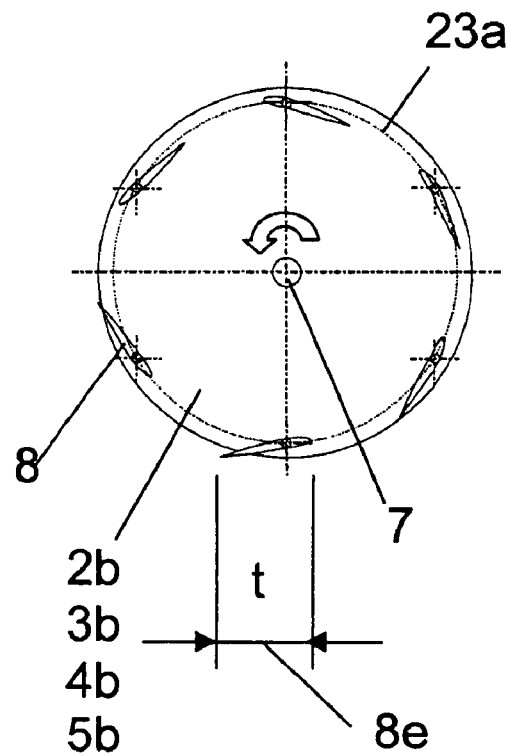

As is shown in FIG. 7, a lifting body 2, 3, 4, 5 substantially consists of a rotary axis 7, two end disks 2a-2b, 3a-3b, 4a-4b, 5a-5b with the diameter D 23b and a certain number (preferably 4 to 10) of rotor blades 8 which are arranged movably about a swiveling axis 8A in the two end disks (e.g. 2a-2b) and describe a circular path 23a with the radius R 23 during a full rotation. The depth of the rotor blade t 8e depends on the size of the overall construction and is approximately 30 to 50% of the circular path radius R 23. The length L 8d of the rotor blade 8 is preferably approximately 25 to 35% of the total length of the aircraft. When in operation, the lifting body rotates at a nominal speed (preferably approximately 750 to 300 1/min) about the rotary axis 7. During a full rotation, the rotor blades 8 are set in every momentary position individually with respect to the tangent 23b of the circular path 23a with the radius R 23, so that in the region of the upper and lower extreme position maximum lifting forces can be generated and only flow resistance forces act upon the rotor blade in the two vertical extreme positions. The preferred arrangement of the direction of rotation 20 of the lifting bodies in the aircraft is in the opposite direction.

Figure 8:
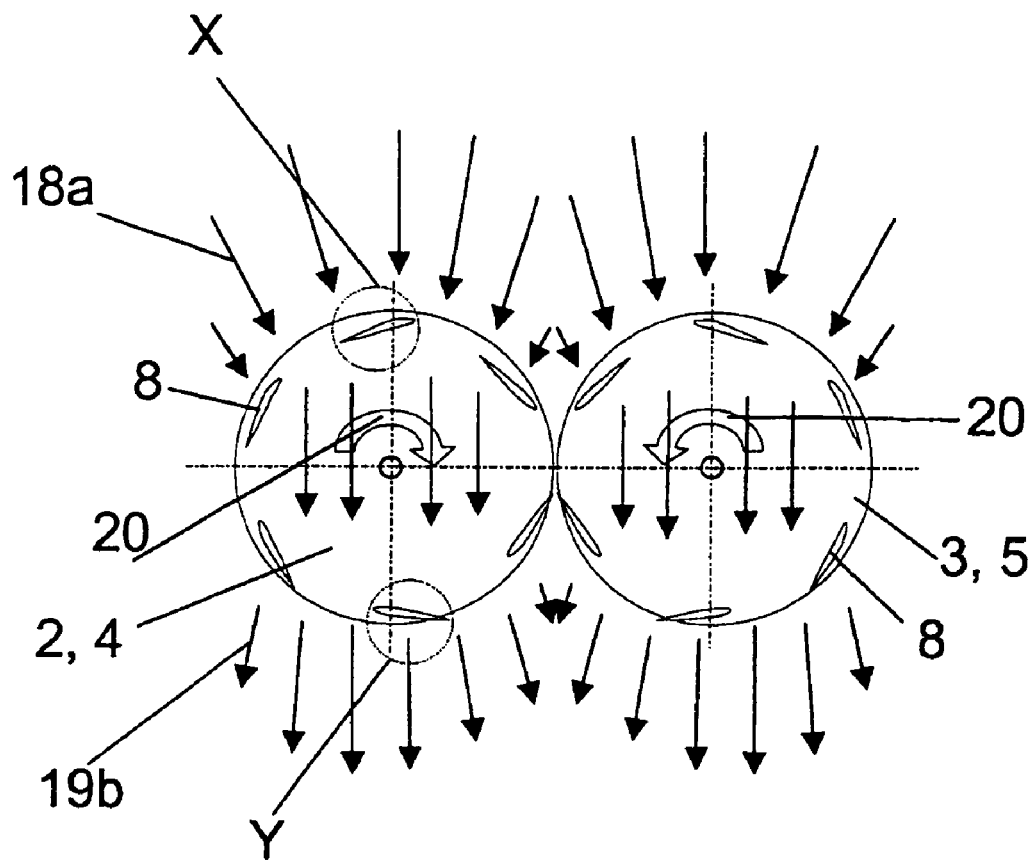
FIG. 8, FIG. 8A and FIG. 8B show the configuration, direction of rotation and function of the lifting body of FIG. 1.
Figure 8A:
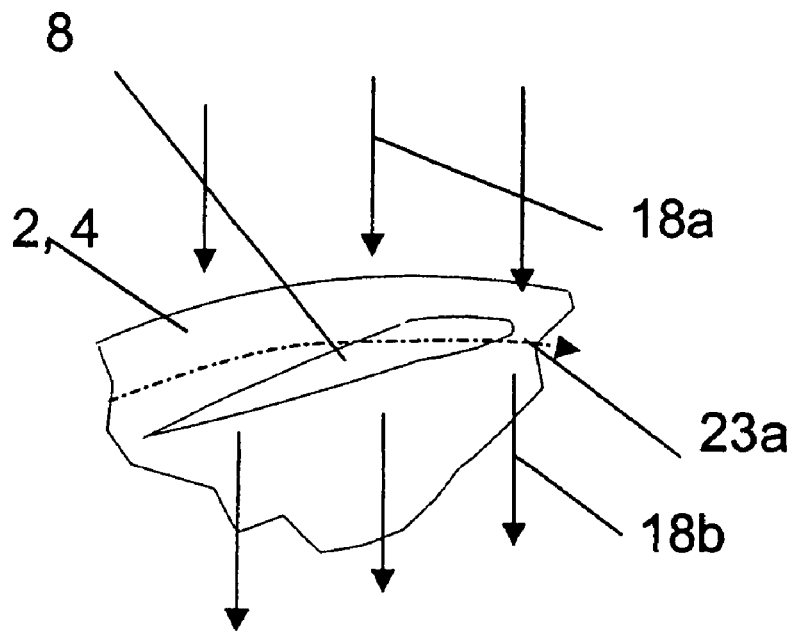
Figure 8B:
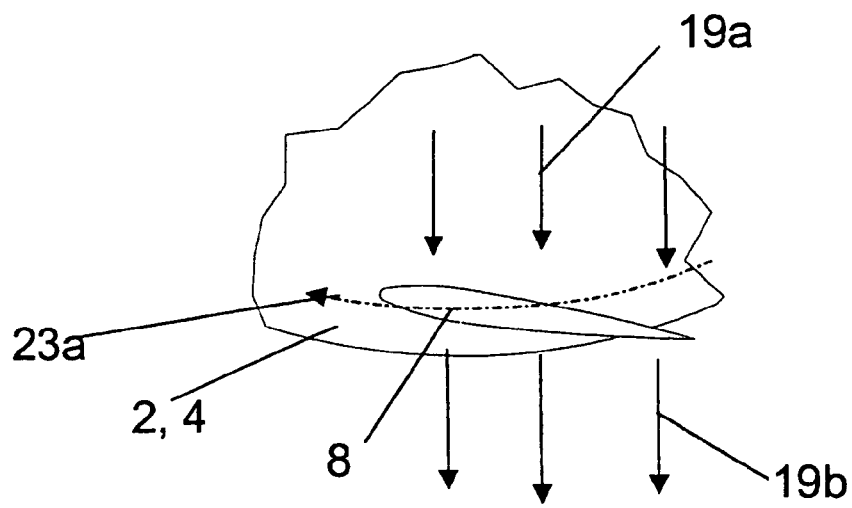
Figure 9:
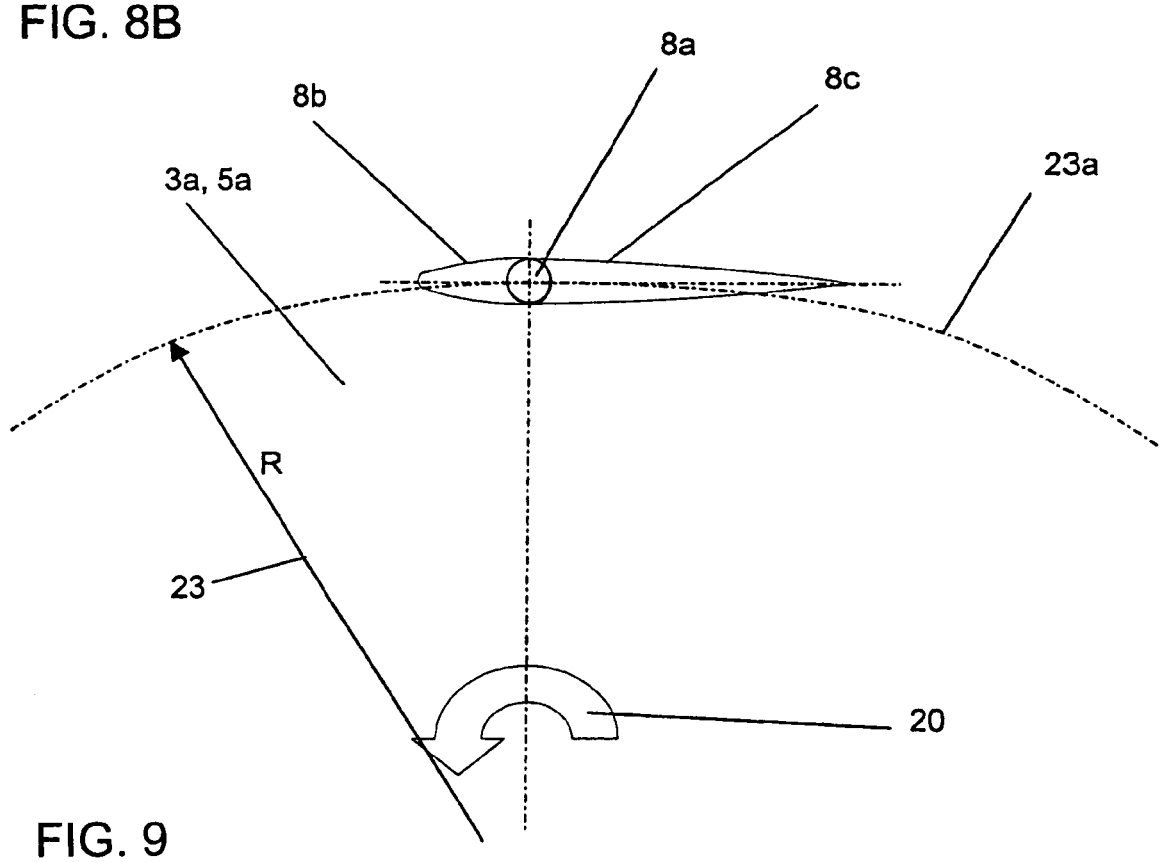
FIG. 9, FIG. 9A and FIG. 9B show a rotor blade with two movable segments in a cross-sectional view in the position of neutral lifting forces, maximum lift and negative lift of the aircraft of FIG. 1.
Figure 9A:
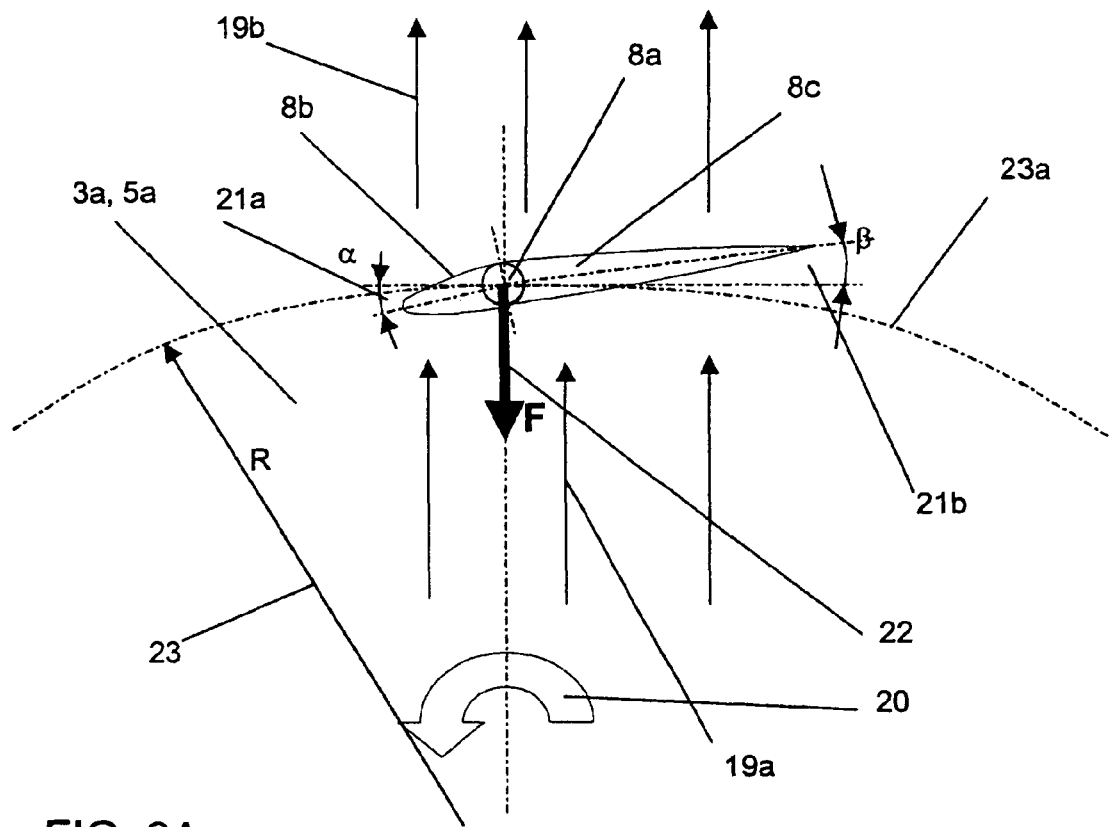
Figure 9B:
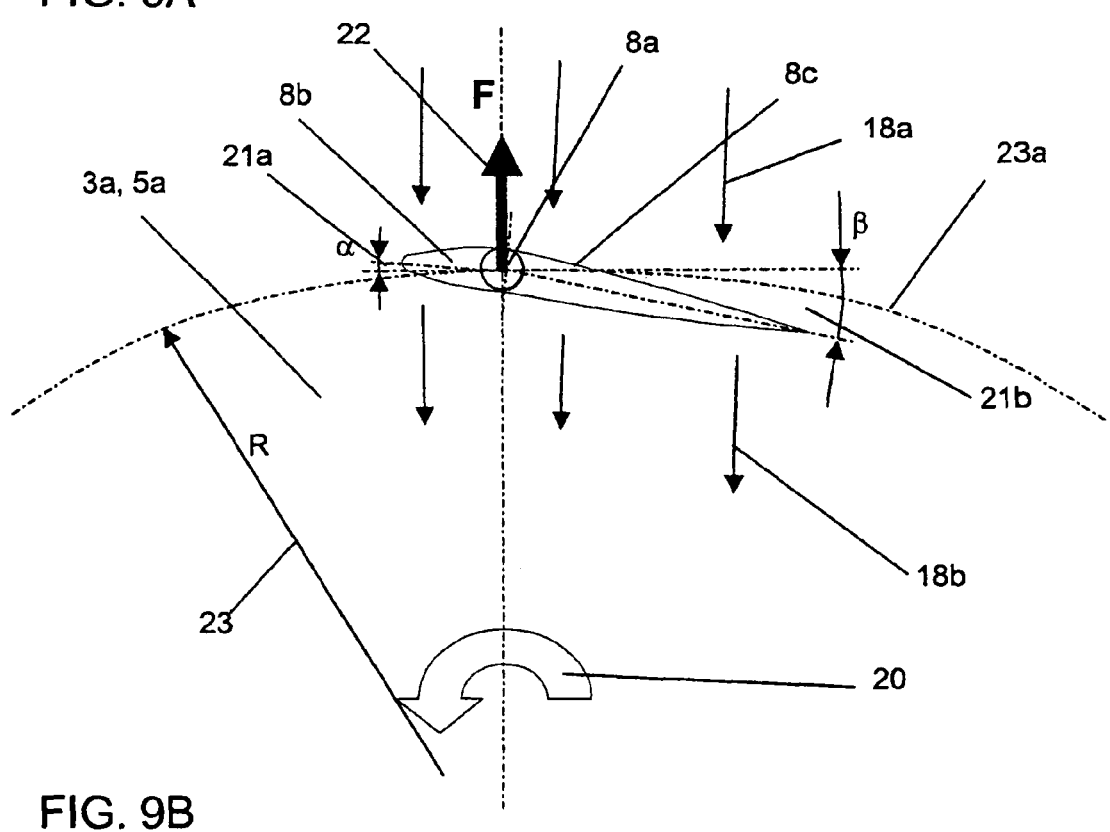
Figure 10:
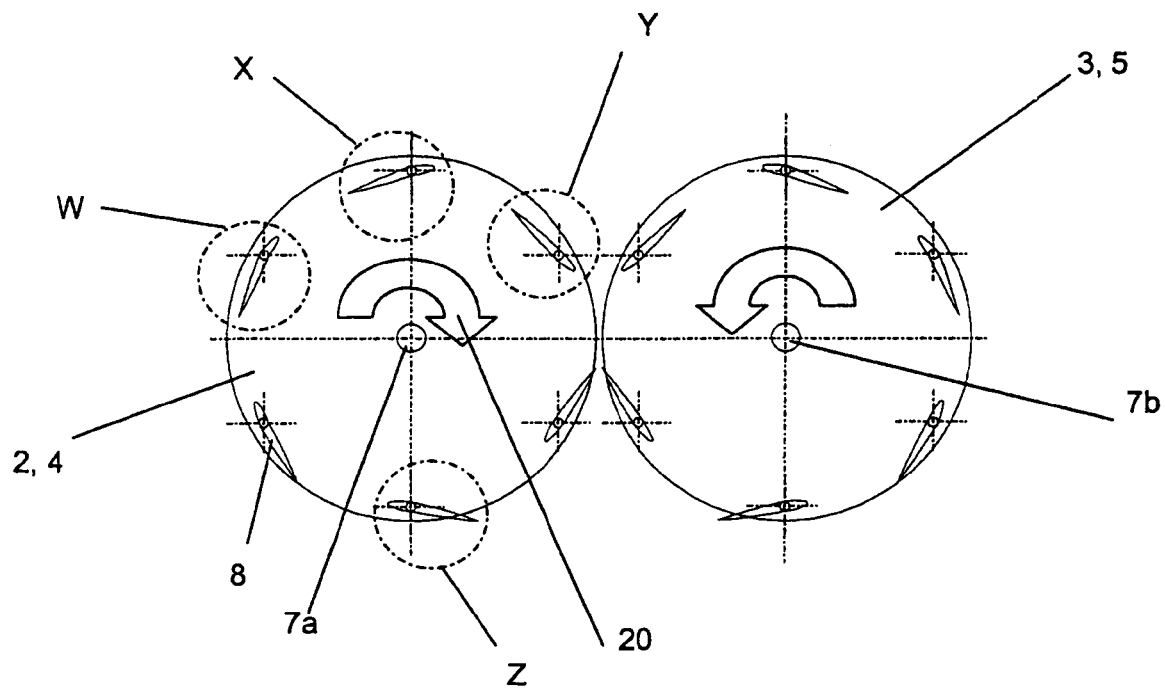
FIG. 10, FIG. 10A, FIG. 10B, FIG. 10C and FIG. 10D show rotor blade incidences in selected positions along the direction of rotation of the lifting body of the aircraft of FIG. 1.
Figure 10A:
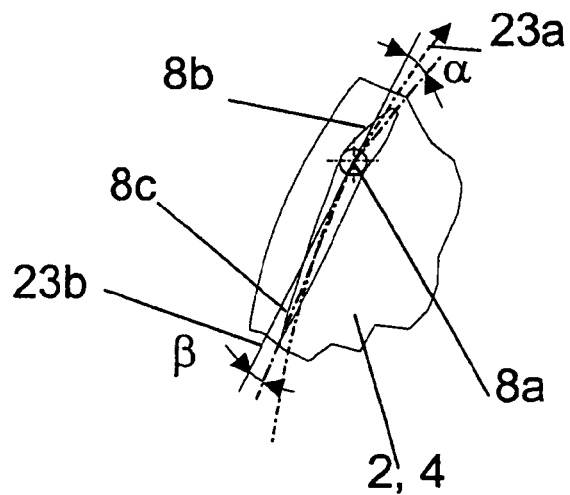
Figure 10B:
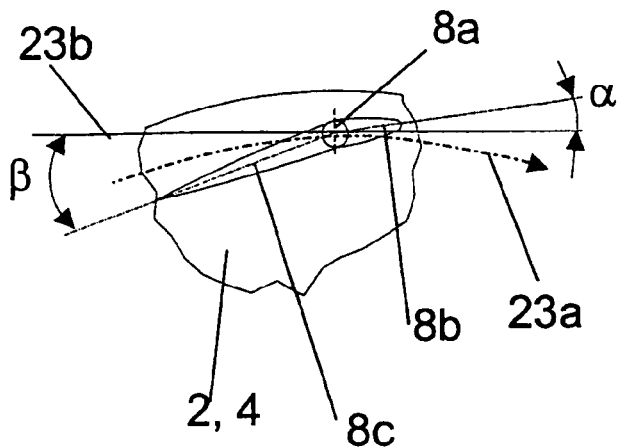
Figure 10C:
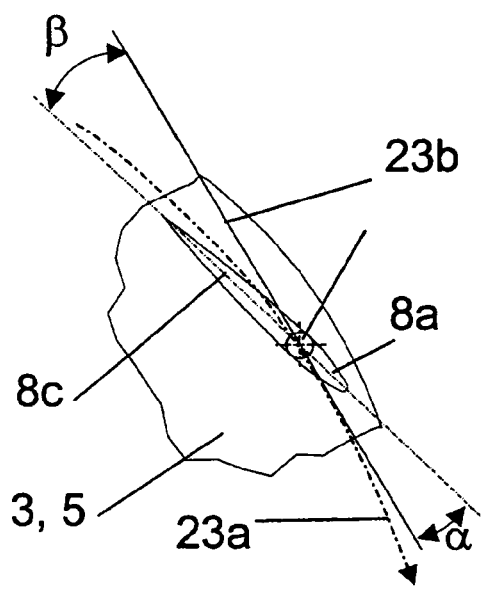
Figure 10D:
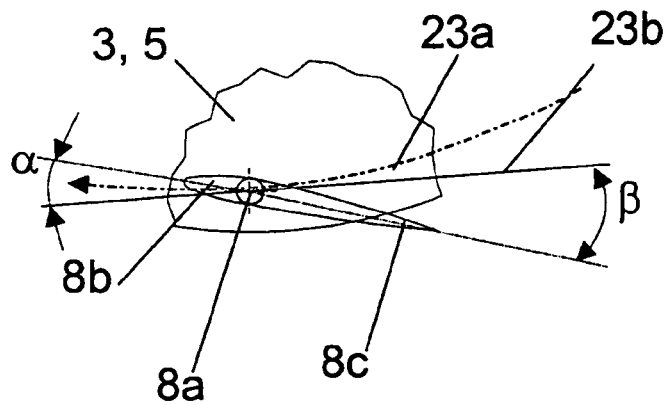

FIG. 8 shows the flow conditions in closer detail. The airfoil theory is relevant as a result of the rotor blade geometry, according to which at a defined relative speed a pressure increase is generated beneath the set rotor blade and a negative pressure above the same. The respective force components acting upon the rotor blade are the result of these two pressure components. Ambient air is preferably taken in from above 18A at a respective incidence of the rotor blades relative to tangent 23b of the circular path 23a during a fill rotation of the lifting bodies 2, 3, 4, 5 at nominal speed, pressed into the rotating lifting body 18B, sucked downwardly 19B. An optimal embodiment is shown in FIG. 9, FIG. 9A and FIG. 9B. In this embodiment the rotor blade 8 consists of at least three elements, which are a stable pivoting axis 8A, a movable rotor blade nose 8B and a movable rotor blade tip 8c. For normal operations, the rotor blade nose 8B is swivellable about the angle α 21a, preferably by +/−3° to 10° relative to the tangent of the circular path 23a and the rotor blade tip 8c is swivellable about the angle β 21b, preferably by +/−3° to 10° relative to the tangent of the circular path 23a. The rotor blade tip and rotor blade nose are swivellable by >90°, preferably approximately 105°, for the special case of "autorotation". Ac-cording to FIG. 9A, a vertical force component Fa 22 can be generated in the direction of the rotary axis 7 of the lifting body when at a nominal speed in the up-per extreme position the rotor blade nose 8B is set at the angle α<0° and the rotor blade tip with the angle β>0°, each relating to the tangent direction 23b of the rotary circular path 23a, and vice-versa according to FIG. 9B a vertical force component Fa 22 can be generated against the direction of the rotary axis 7 of the lifting body when at a nominal speed in the upper extreme position the rotor blade nose 8B is set at the angle α>0° and the rotor blade tip with the angle β<0°, each relating to the tangent direction 23b of the rotary circular path 23a. FIG. 10 shows in detail the two oppositely driven lifting bodies with the incidences of the rotor blades in different positions, which incidences are optimal for generating a maximum lifting force at nominal speed. FIG. 10A (a detail W of FIG. 10) shows the angular conditions of the rotor blade nose and the rotor blade tip upon entering the upper circular path after leaving the neutral vertical position. FIG. 10B (detail X of FIG. 10) shows the angular conditions of the rotor blade nose and rotor blade tip in the upper extreme position of the circular path. FIG. 10C (detail Y of FIG. 10) shows the angular conditions of the rotor blade nose and rotor blade tip in the upper circular path prior to the entrance in the neutral vertical position. FIG. 10D (detail Z of FIG. 10) shows the angular conditions of the rotor blade nose and rotor blade tip in the lower extreme position of the circular path.

Figure 11:
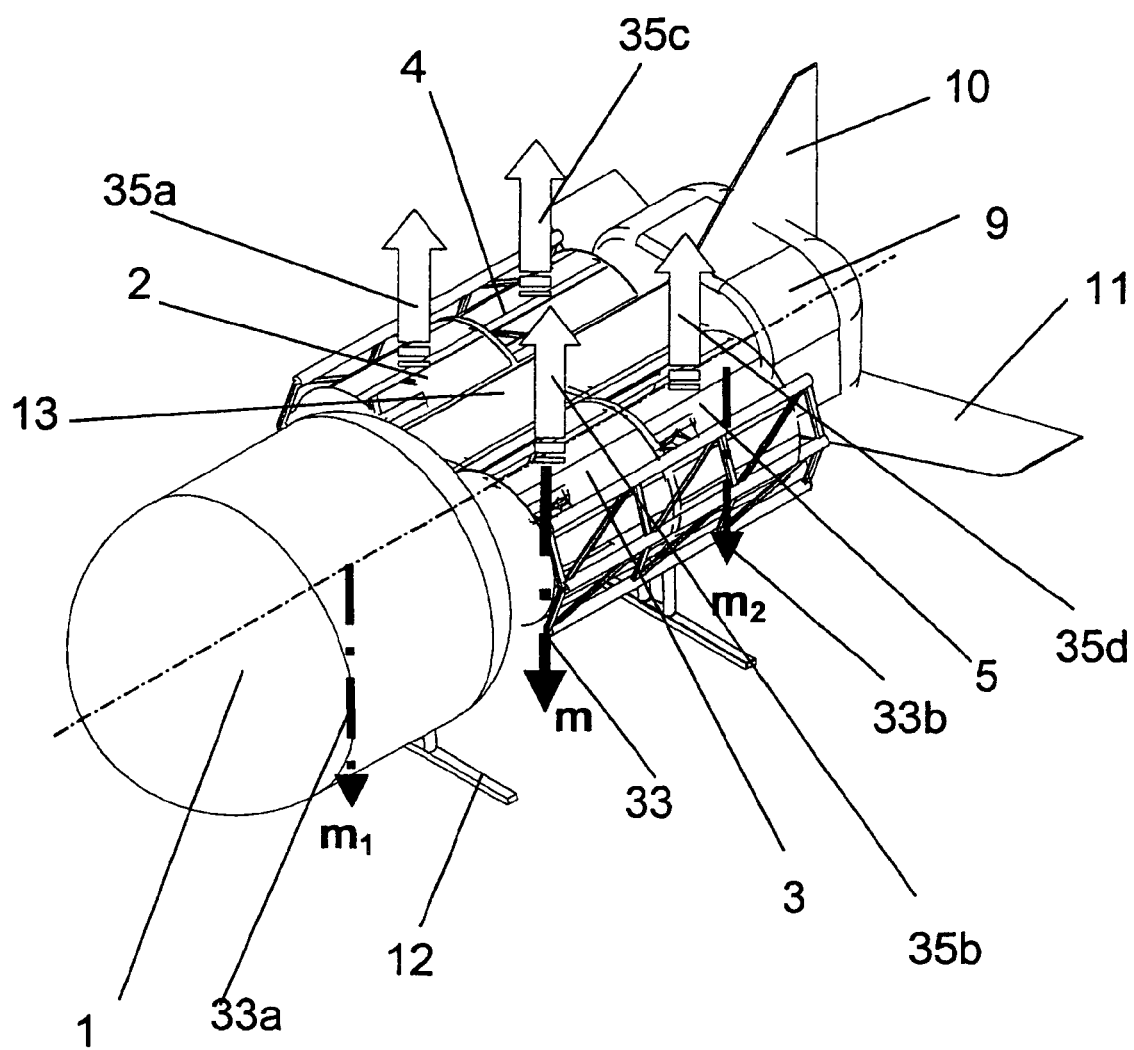
FIG. 11 shows the individual lifting forces of the lifting bodies for achieving a stable equilibrium in the air by the aircraft of FIG. 1.
Figure 12A:
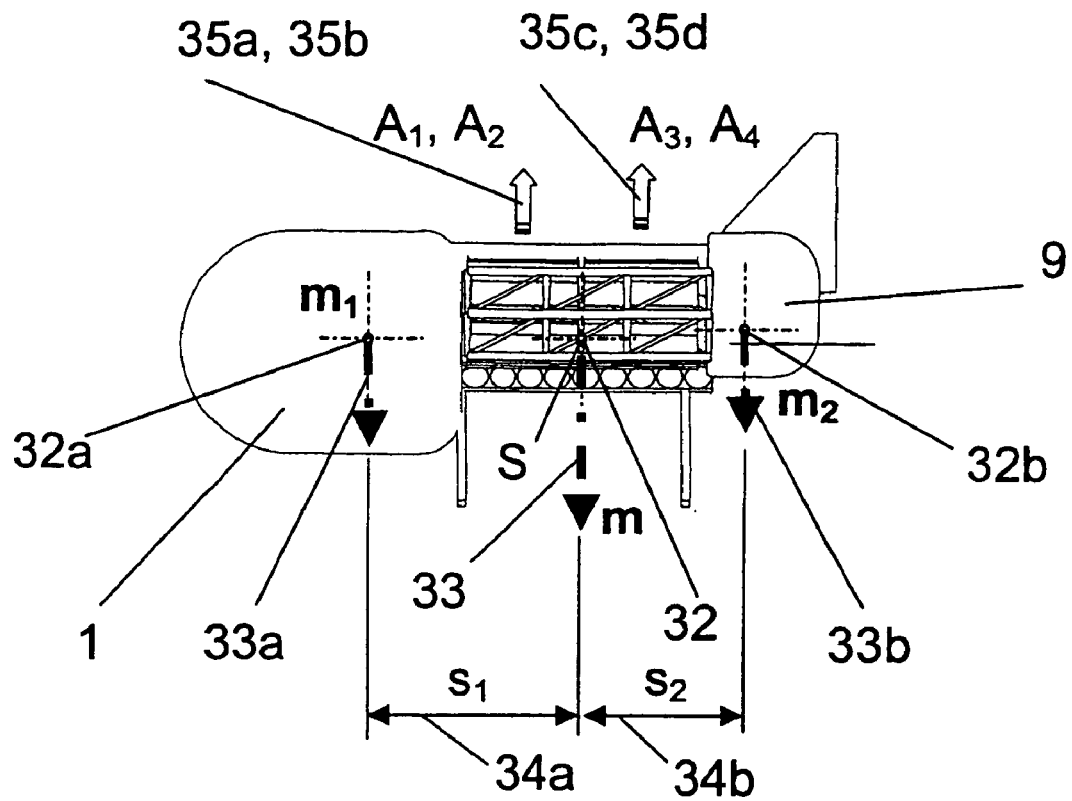
FIG. 12A and FIG. 12B show the position of the individual and overall centers of mass of the aircraft of FIG. 1.
Figure 12B:
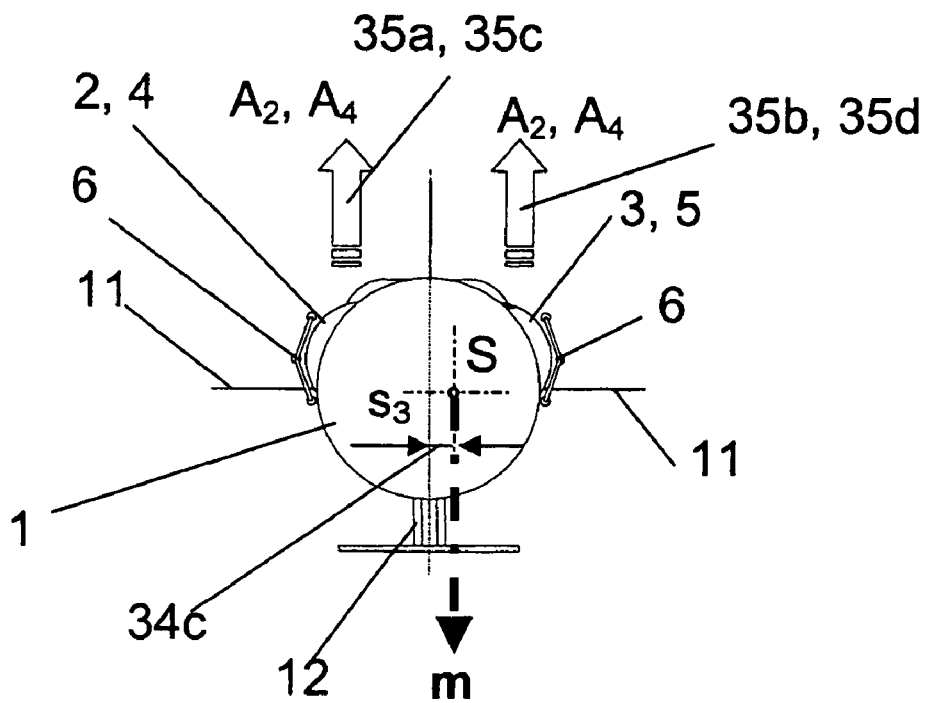

A stable equilibrium position in FIG. 11, FIG. 12A and FIG. 12B in the air is pro-vided in such a way that every single lifting body 2, 3, 4, 5 can generate individual lifting forces $A_1$ through $A_4$ 35a, 35b, 35c and 35d and thus an equilibrium state relative to the overall center of mass S 32 of the overall mass m33 and to the bulk centers of mass 32a of the partial mass of cockpit $m_1$ 33a, with the partial center-of-gravity distance $s_1$ 34a, and 32b of the partial mass of the rear region of the aircraft $m_2$ 33b, with the partial center-of-gravity distance $s_2$ 34b, and the lateral center-of-gravity distance $s_3$ 34c of the overall center of mass S 32 of the overall mass m 33 can be produced in each situation. This allows responding at all times to any changing equilibrium position.

Figure 13:
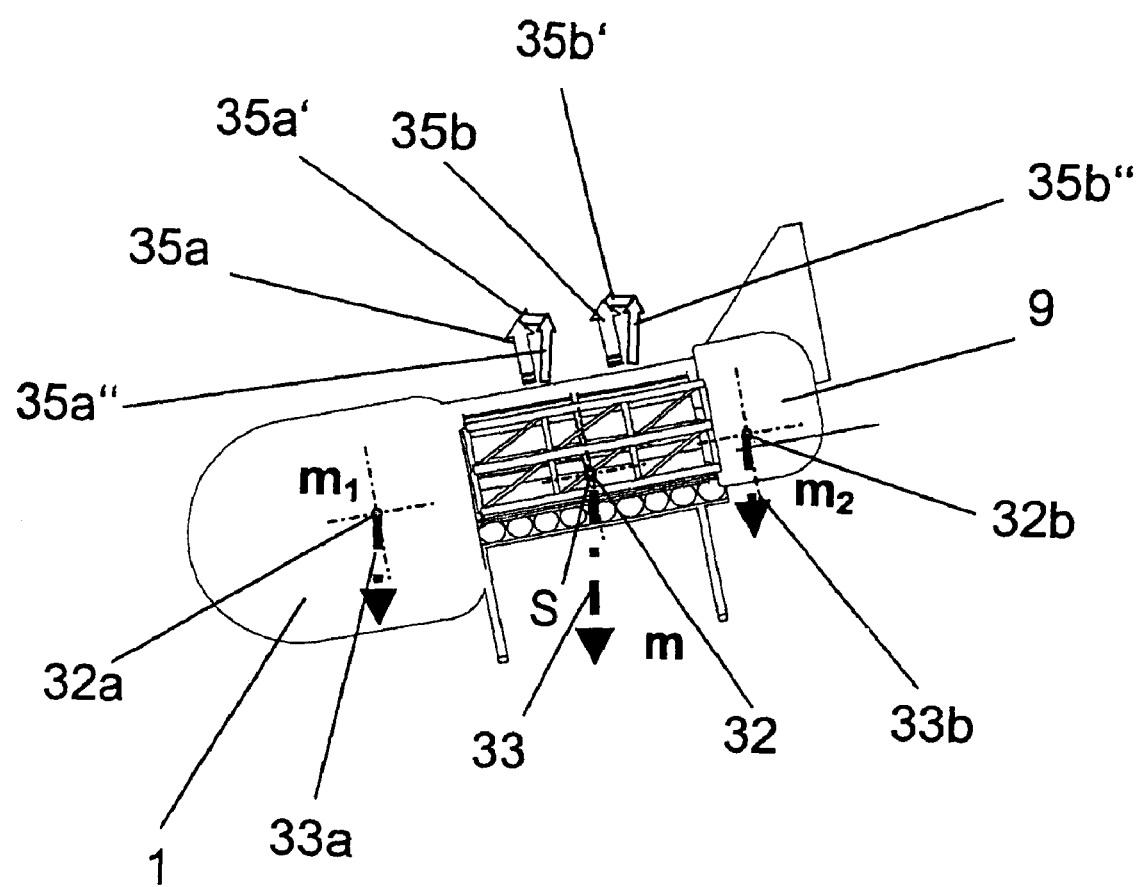
FIG. 13 shows the forwardly inclined position of the aircraft of FIG. 1 for achieving a forward drive component for slow forward movement.

After reaching a defined height position, which can be assumed by means of the rotating lifting bodies 2, 3, 4, 5, a transition from a hovering state to a slow forward movement or rearward movement is thus enabled in such a way that the aircraft assumes an inclined position (FIG. 13) and a force component 35a', 35b' can be derived from the resulting lifting force 35a, 35b of the lifting bodies, which force component allows a forward or rearward acceleration, whereas the vertical force component 35a", 35b" continues to keep the aircraft vertically in the equilibrium.

Figure 14:
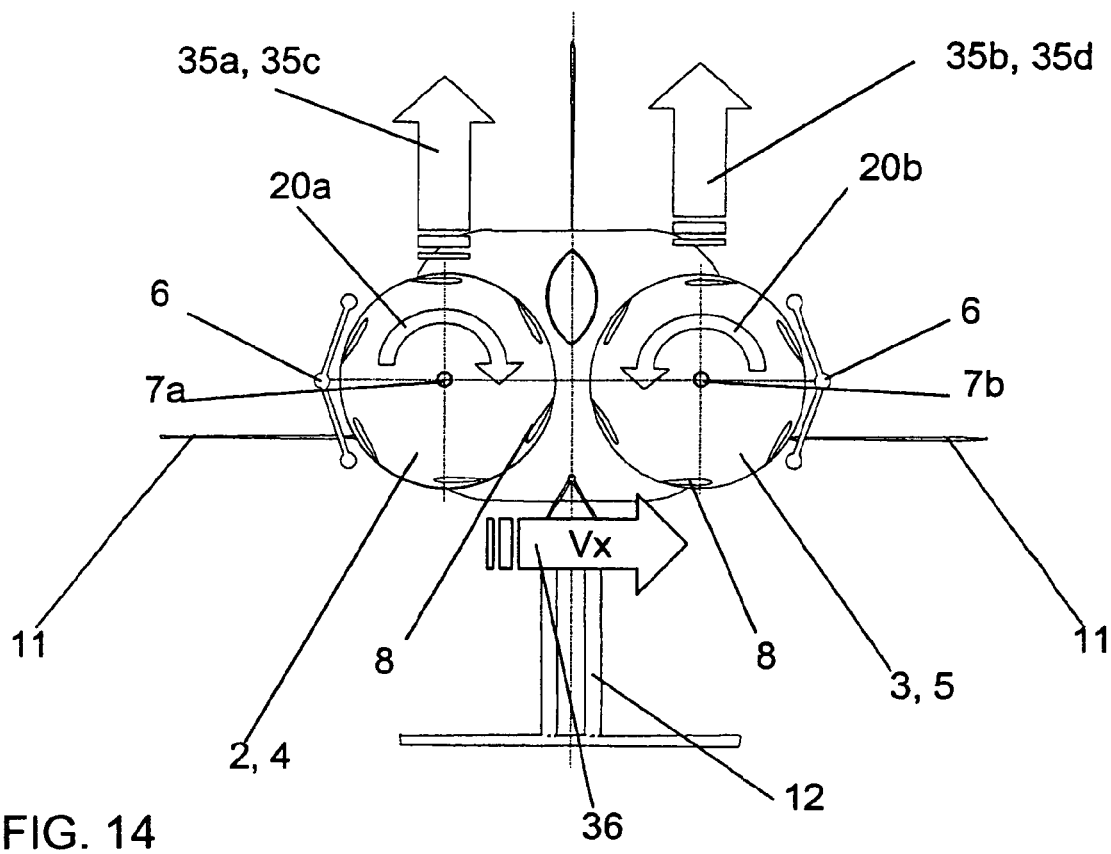
FIG. 14, FIG. 14A, FIG. 14B, FIG. 14C and FIG. 14D show the lifting body configuration and the incidence of the rotor blades for achieving lateral forces for the transversal movement of the aircraft of FIG. 1.
Figure 14A:
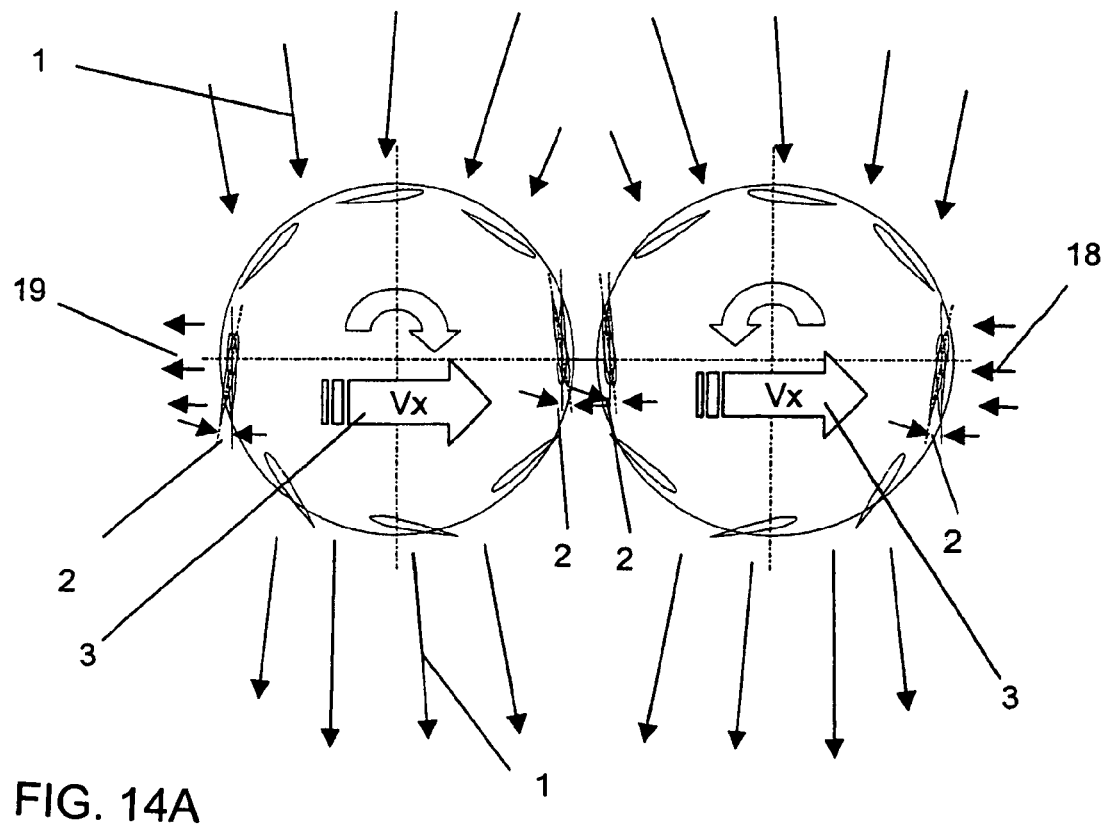
Figure 14B:
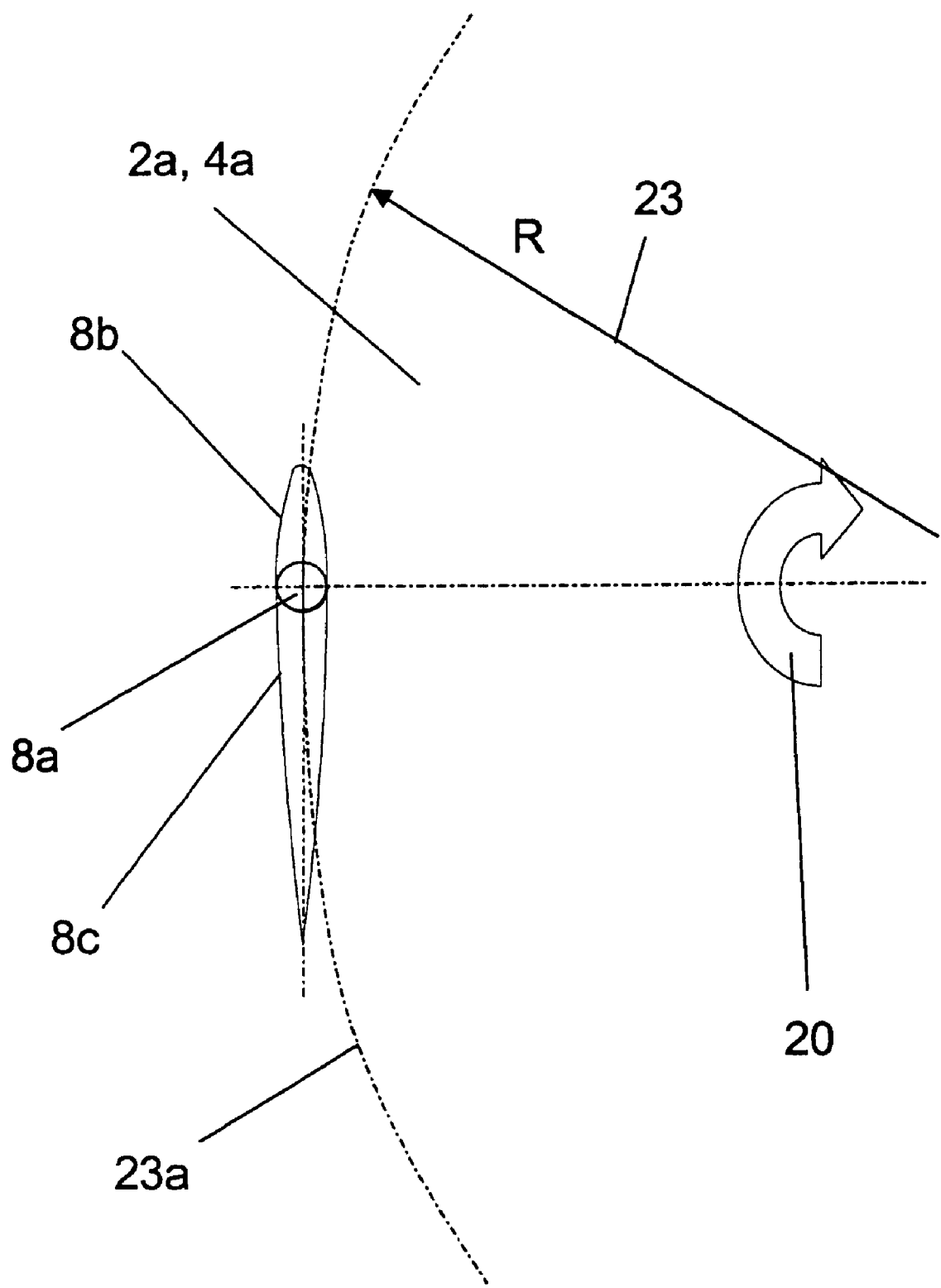
Figure 14C:
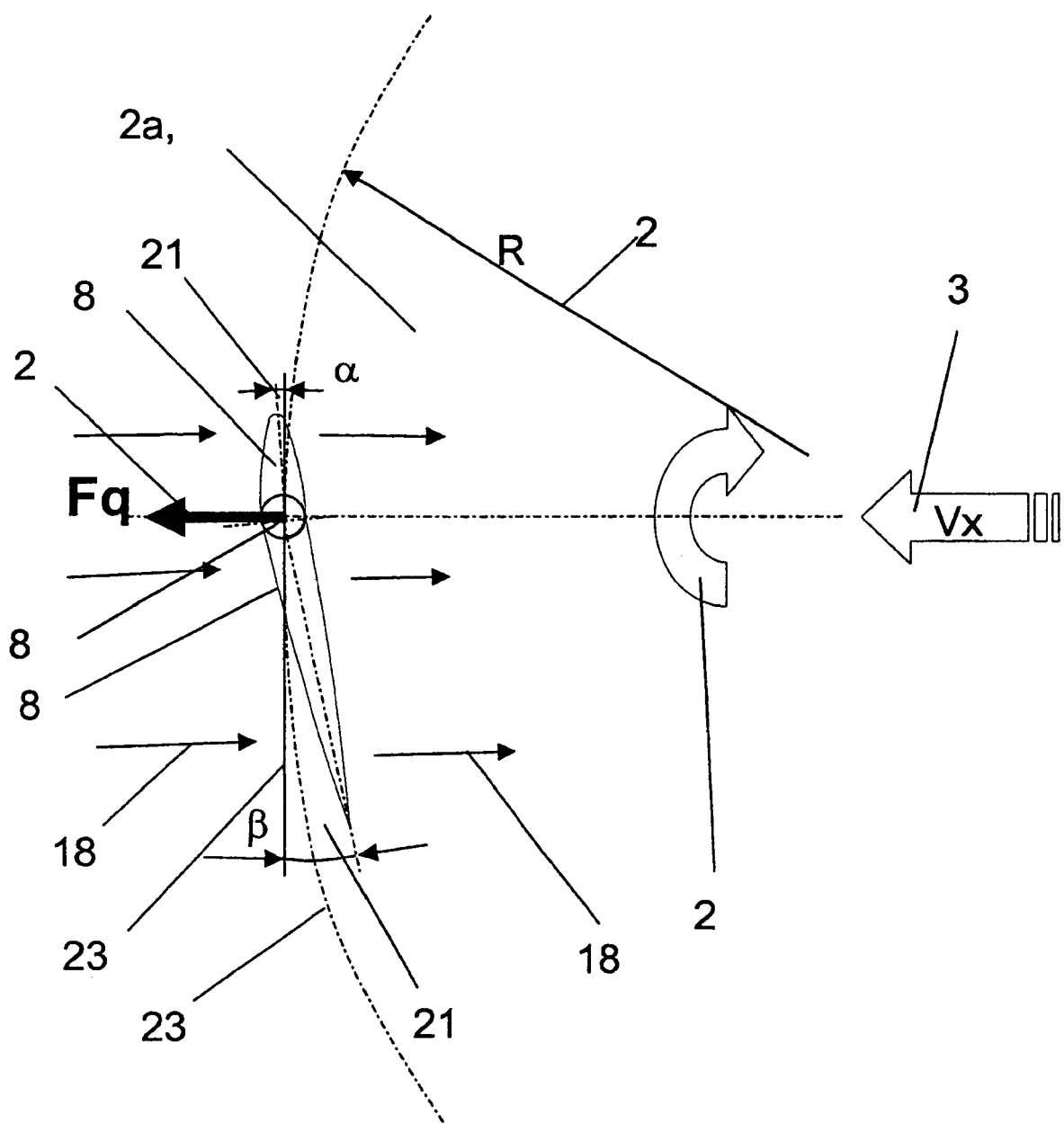
Figure 14D:
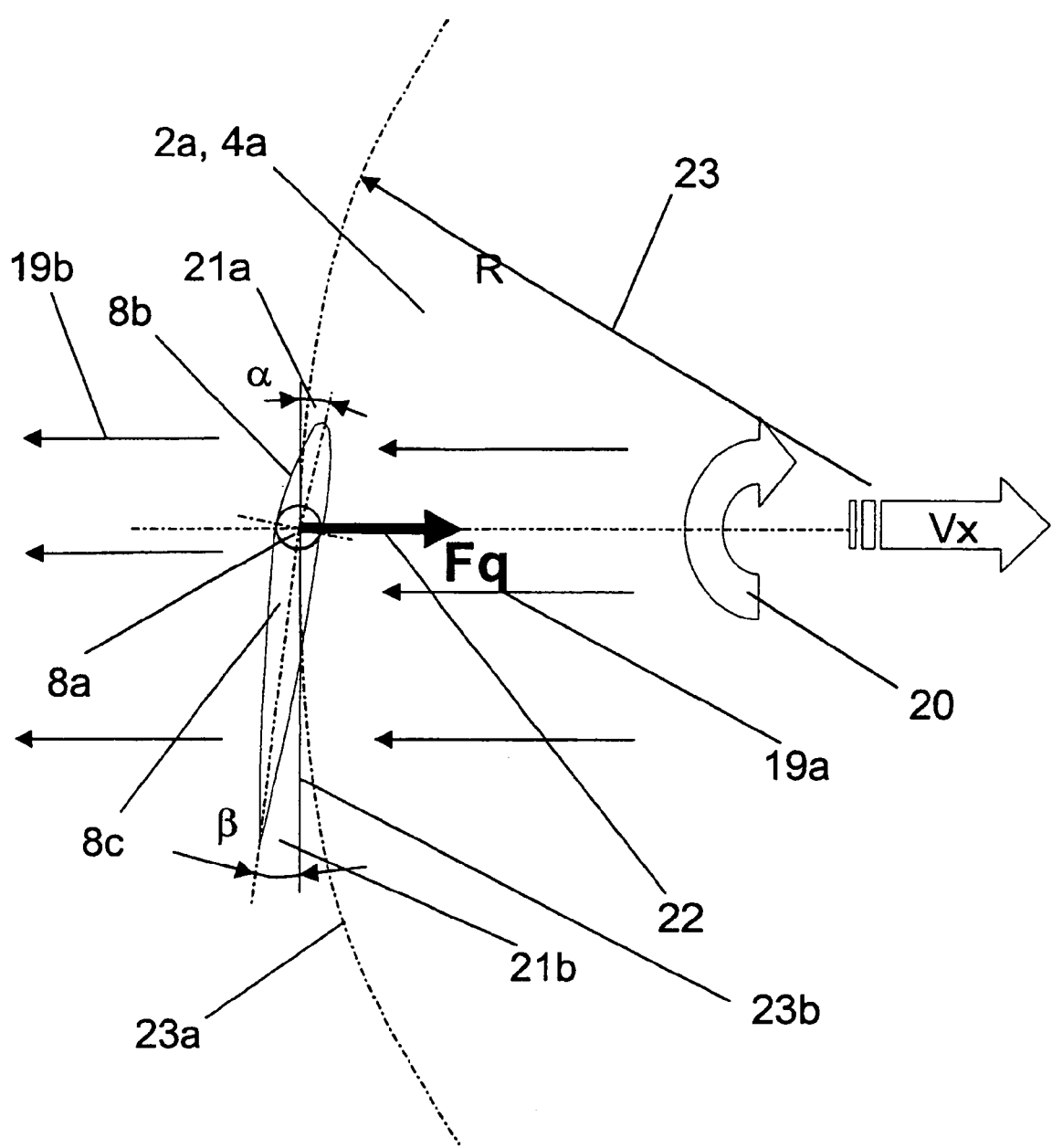
Figure 15:
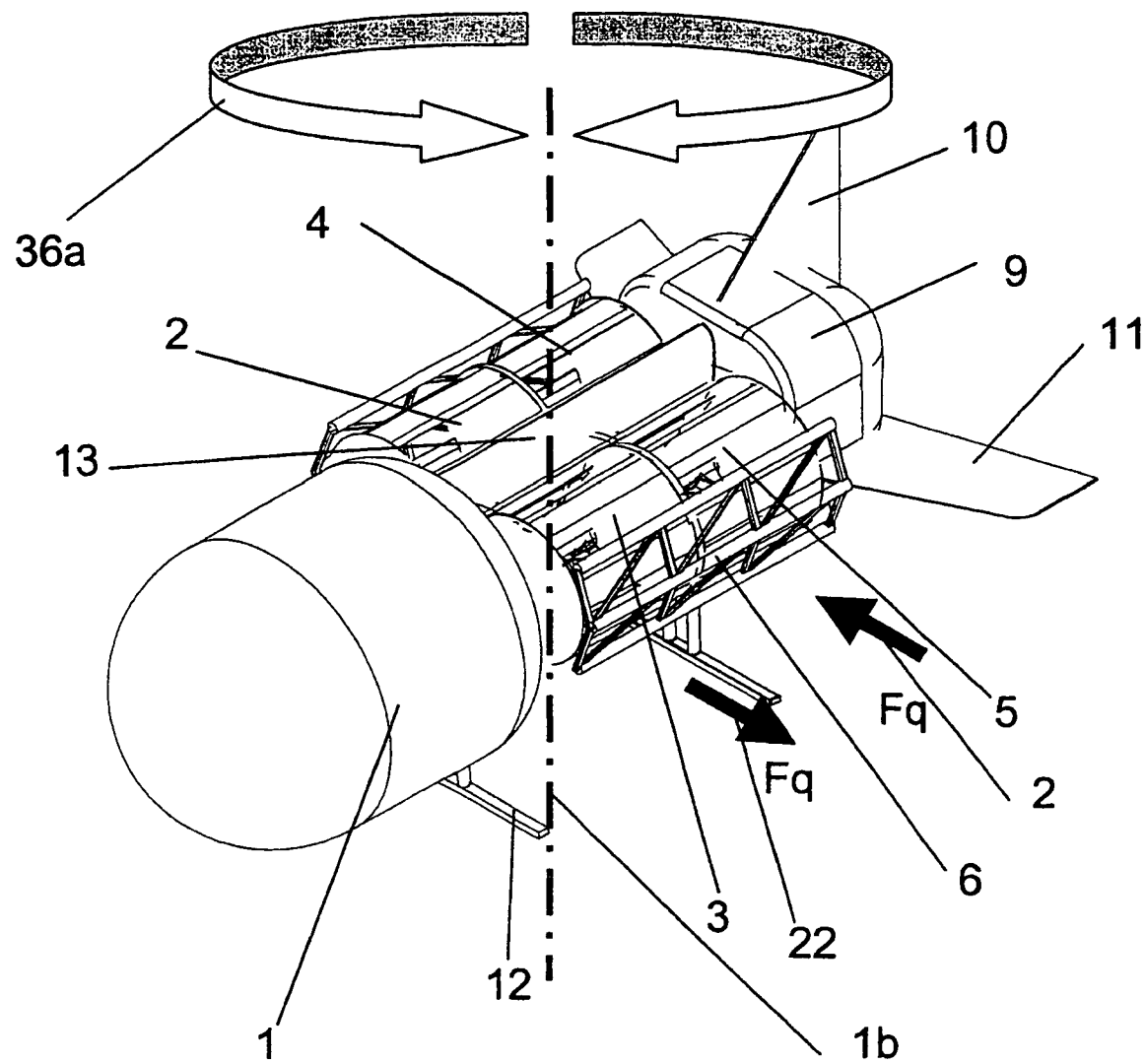
FIG. 15 shows the generation of a force component acting in pairs in opposite directions transversally to the longitudinal axis of the aircraft for generating a rotary movement of the aircraft about the vertical axis.

A movement of the aircraft transversally to the longitudinal axis is enabled in the hovering state through a special incidence of the rotor blades relative to the tangent direction 23b of the path of movement 23a of the rotor blades. FIG. 14 shows a transversal movement with the speed $v_x$ 36 which is achieved in such a way that according to FIG. 14A the rotor blades in the position of vertical extreme position are brought to a respective inclined position 21, so that air is sucked in from one direction 18A and is pressed out 19B virtually transversally through the aircraft. The airfoil theory is applicable in this case too. FIG. 14B shows the rotor blade position in a neutral position, whereas according to the rotor blade incidence according to FIG. 14C a force component Fq 22 would act upon the aircraft away from the rotary axis and would have a movement with the speed $v_x$ 36 from the right to the left. According to the illustration according to FIG. 14D, a force component Fq 22 would act upon the aircraft in the opposite direction, in the direction of the rotary axis, and would lead to a movement with the speed $v_x$ 36 from the left to the right. A rotary movement 36a in the hovering state about the vertical axis 1b of the aircraft clockwise or counter-clockwise can be achieved by paired opposite generation of the force component Fq 22 in the forward and rearward region of the lifting body according to FIG. 15.

Figure 16:
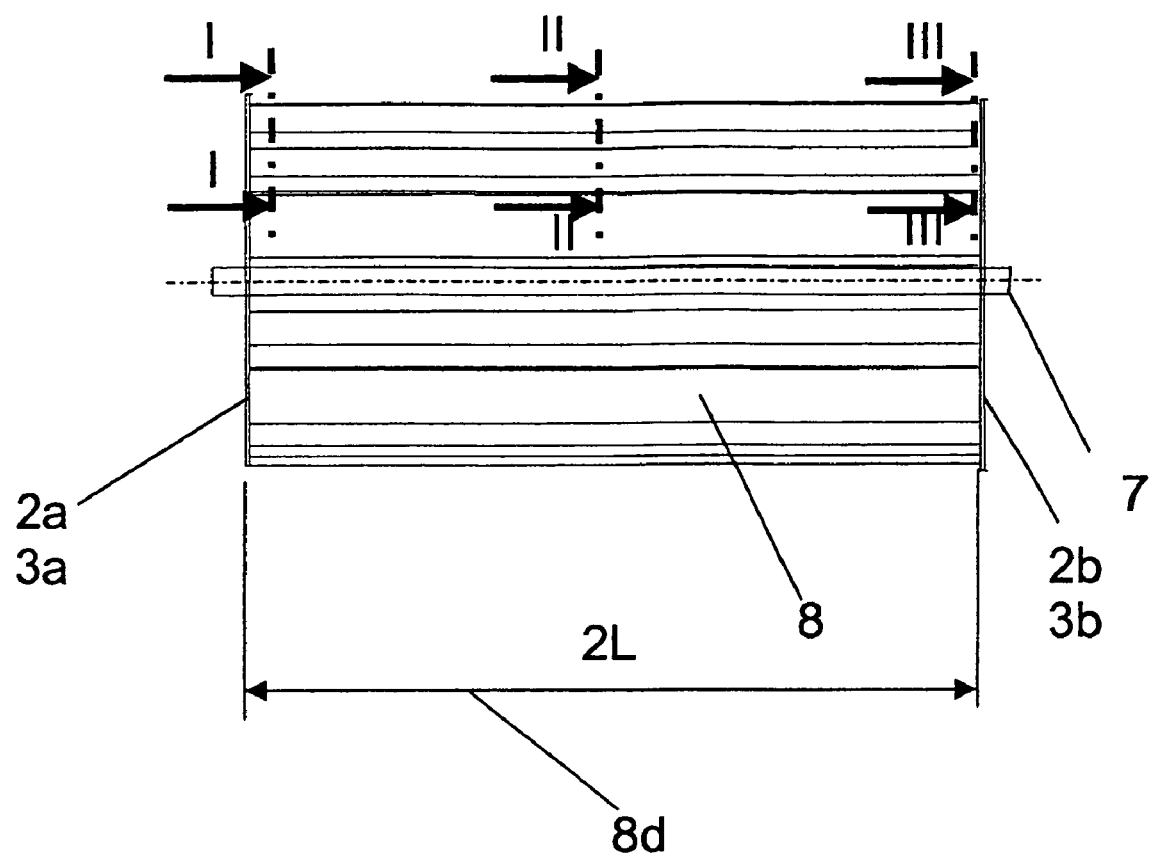
FIG. 16, FIG. 16A, FIG. 16B and FIG. 16C show a special variant of a lifting body with "double" length and rotor blades capable of décalage for generating different lifting and transversal forces of the aircraft of FIG. 1.
Figure 16A:
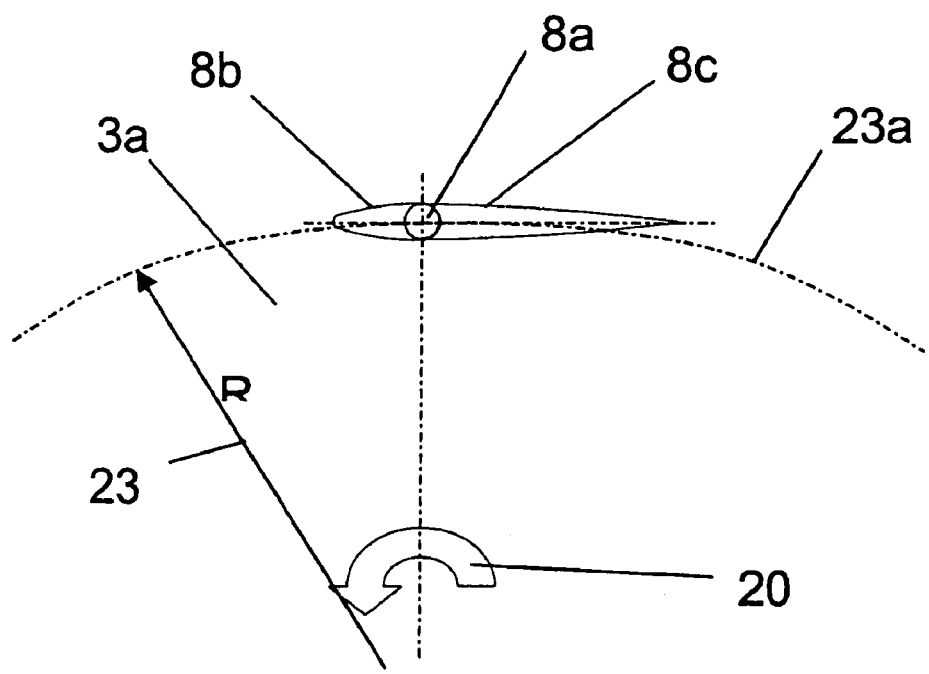
Figure 16B:
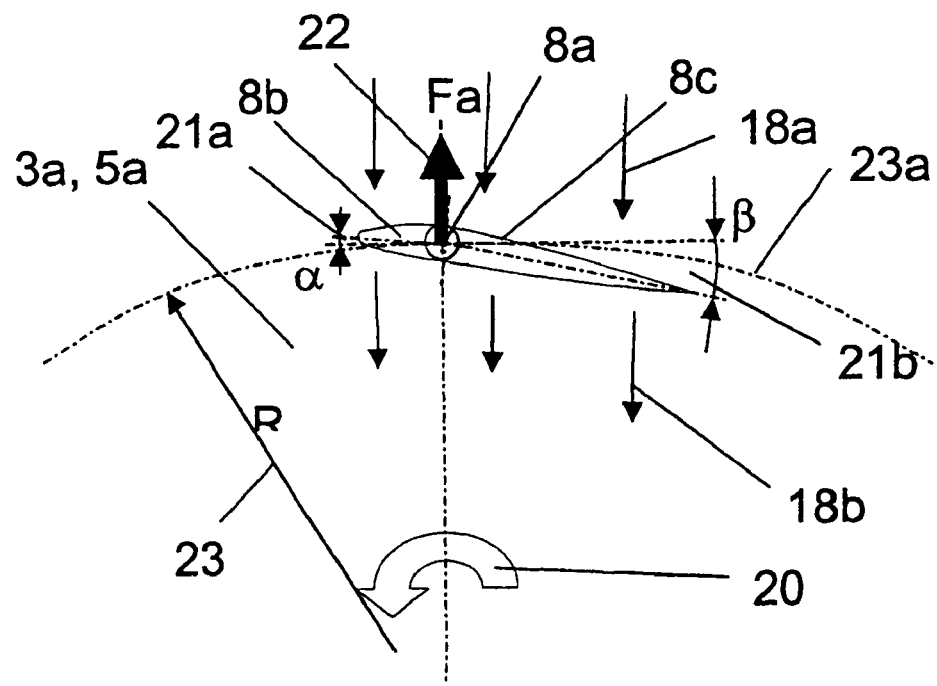
Figure 16C:
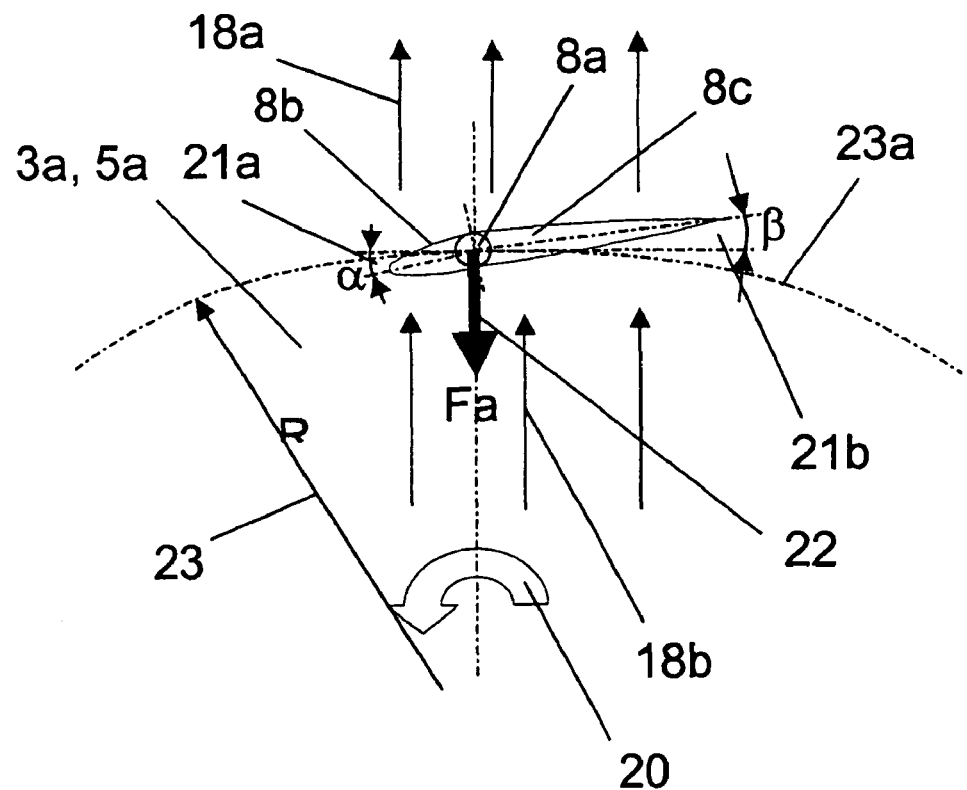

The same as the above described effects and maneuvers can also be achieved in cases where instead of the four only two paired lifting bodies 2, 3 are used which run in opposite directions and are provided with twice the length 2L 8d (FIG. 16). In this embodiment, the rotor blades are elastically deformable about the pivoting axis 8A. The rotor blade nose 8B and the rotor blade tip 8c can be displaced parallel at both ends or in a different way. FIG. 16A shows a neutral position of the rotor blade (sectional view II-II of FIG. 16), as is obtained in the case of a displacement in opposite direction of the two ends of the rotor blade according to FIG. 16B (sectional view I-I of FIG. 16) and FIG. 16C (sectional view III-III of FIG. 16). In an embodiment with only two lifting bodies rotating in opposite directions, this allows correcting different center-of-gravity positions during the flight, performing forward and rearward movements with low flight speed and rotary movements about the vertical axis.

Figure 17:
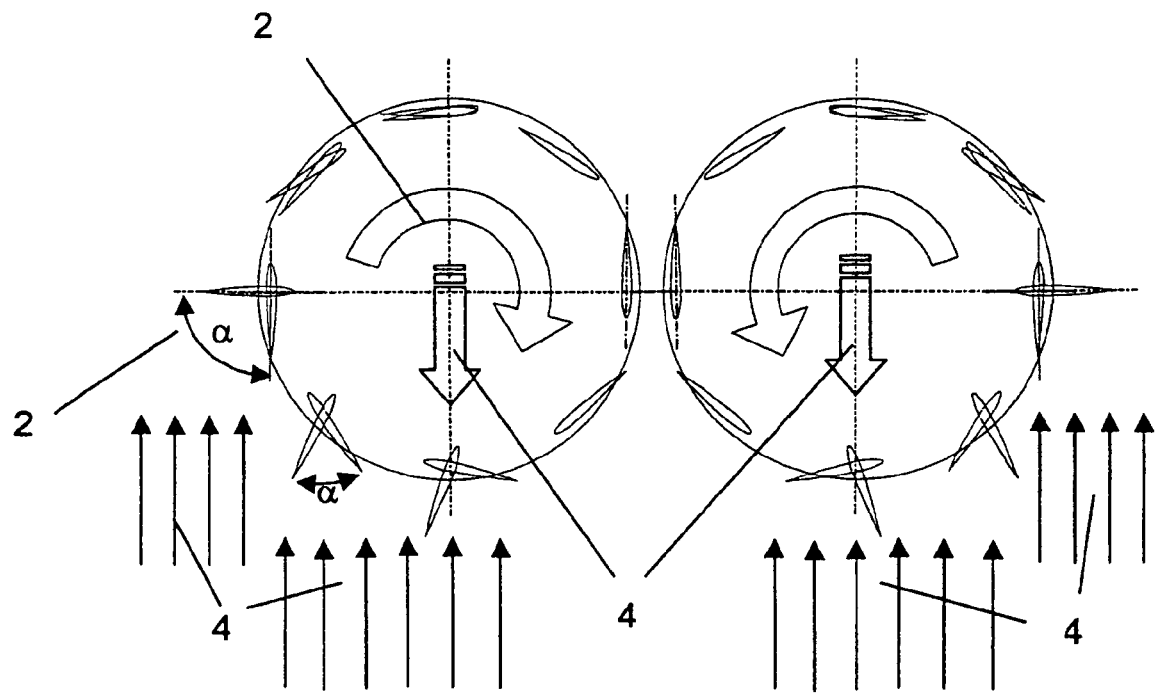
FIG. 17 shows the incidence of the rotor blades during descent in free fall for the purpose of autorotation of the lifting body, e.g. after a motor failure of the aircraft of FIG. 1.

In the case of a sufficiently large adjusting possibility of the pivoting movement of the rotor blade, an autorotation of the lifting bodies and thus a secure landing process is enabled after the failure of a drive unit for example above a critical flying height. FIG. 17 shows the respective angles of incidence α 21 of the rotor blades and the relative air flow 41 and the direction of rotation 20 of the lifting bodies when the aircraft drops with the speed of descent 40 in free fall in the vertical direction.

Figure 18:
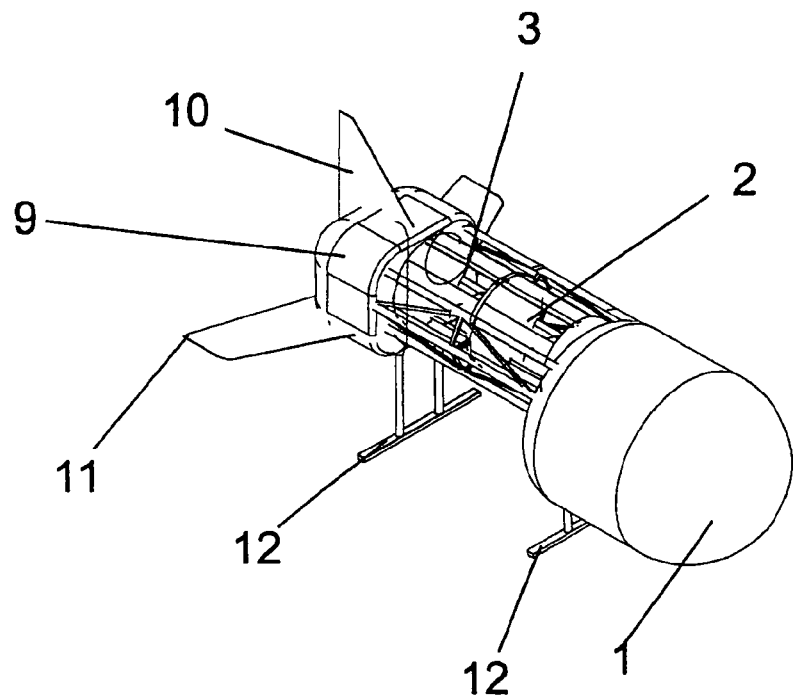
FIG. 18 and FIG. 18A to FIG. 18G show an embodiment of an aircraft with only two lifting bodies which are driven in opposite directions and are arranged successively in a central axis of the aircraft.
Figure 18A:
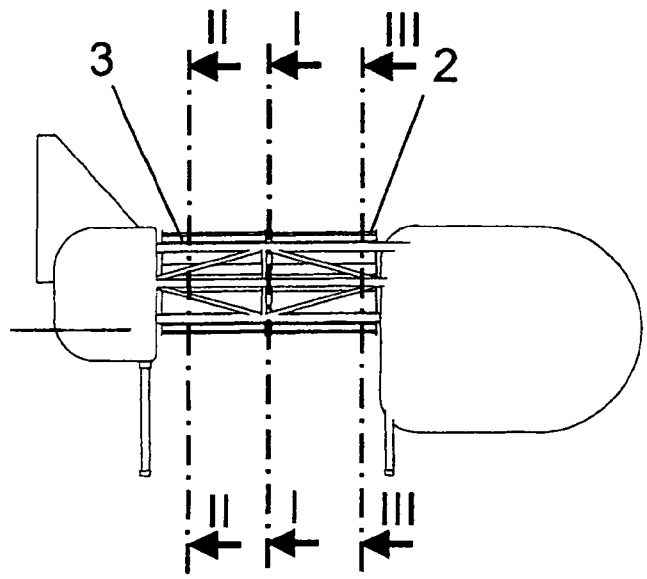
Figure 18B:
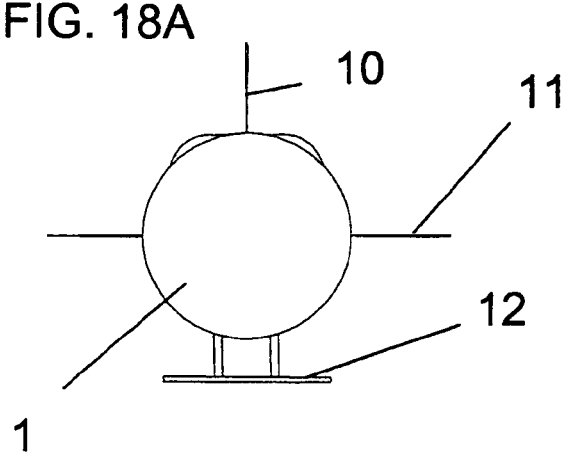
Figure 18C:
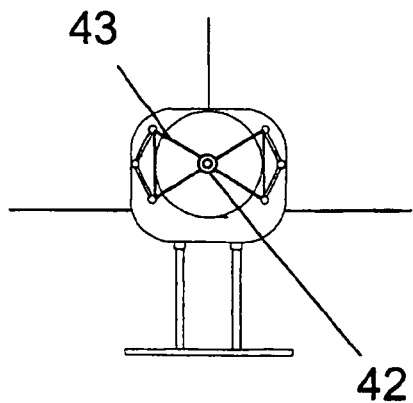
Figure 18D:
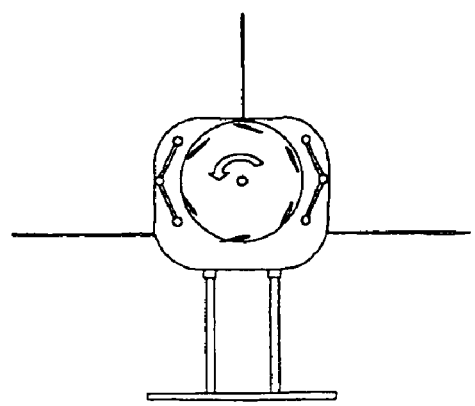
Figure 18E:
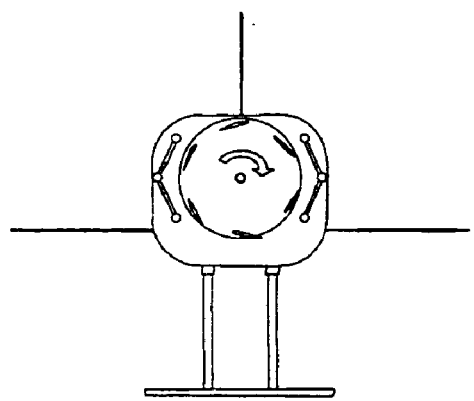
Figure 18F:
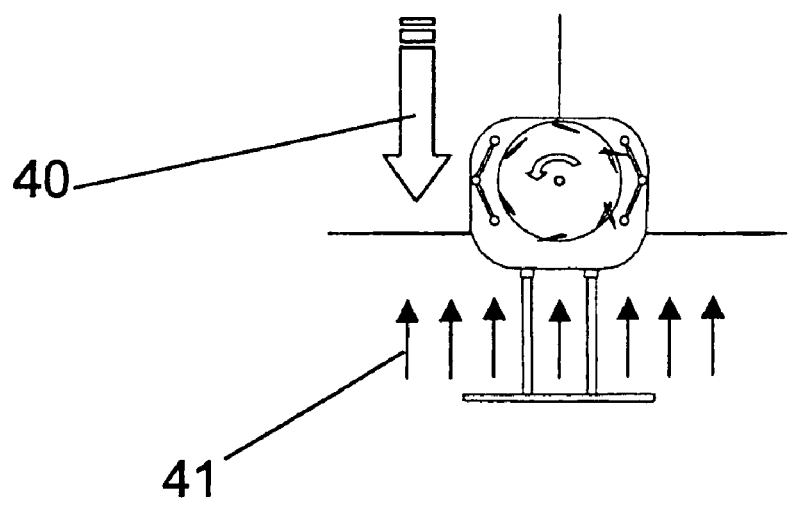
Figure 18G:
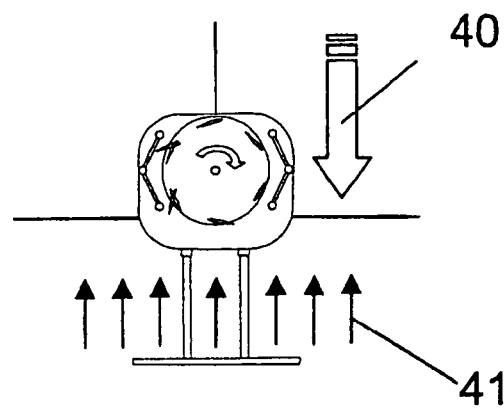

A further embodiment of an aircraft with two lifting bodies 2, 3 rotating in opposite directions is shown in FIG. 18. FIG. 18A shows a side view and FIG. 18B shows a front view. The two lifting bodies rotating in the opposite direction are arranged behind one another along the central axis of the aircraft along a common rotary axis. FIG. 18C shows a sectional view I-I of FIG. 18A, which show the bearing of the rotary axis of the lifting bodies 2, 3 and the lateral protective covering. FIG. 18D shows the sectional view II-II of FIG. 18A and FIG. 18E shows the sectional view III-III of FIG. 18A, which show the arrangement and direction of rotation of the lifting bodies arranged behind one another, in the representation for a conventional hovering state or ascending flight. FIG. 18F shows the sectional view II-II of FIG. 18A, and FIG. 18G shows the sectional view III-III of FIG. 18A in the position of the rotor blades for achieving autorotation in free descent after failure of one drive unit for example.

Figure 19:
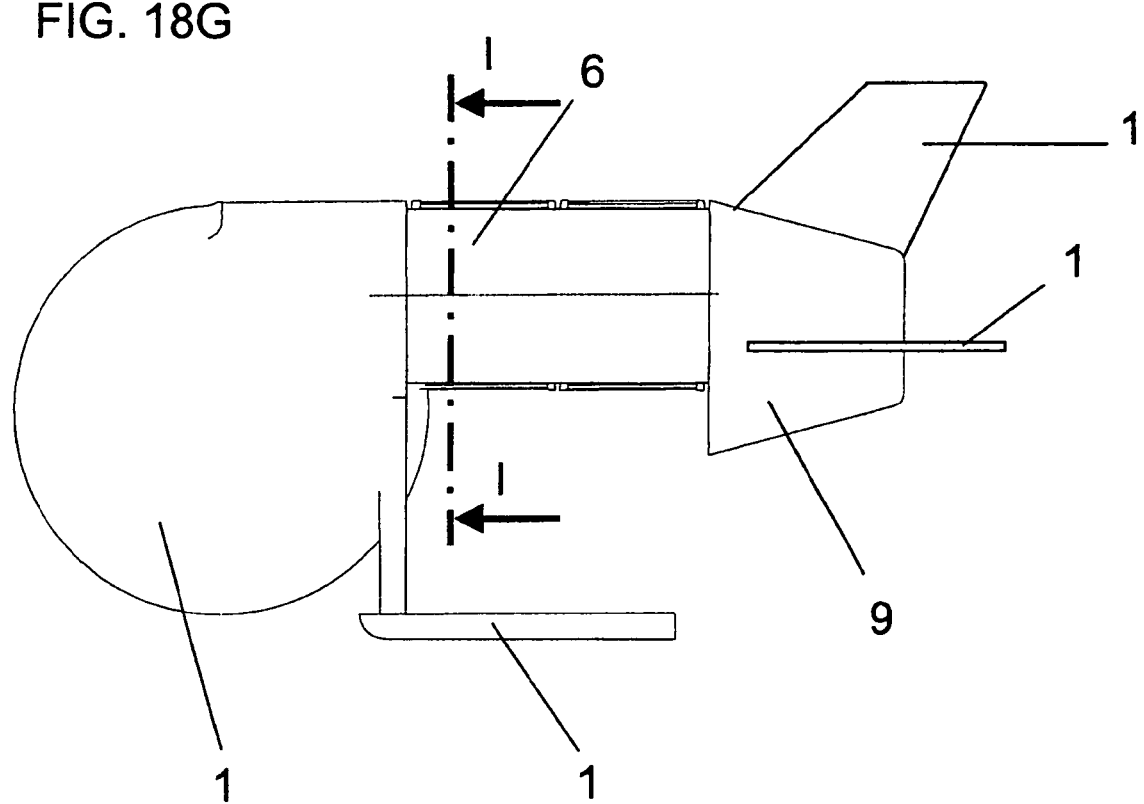
FIG. 19, FIG. 19A and FIG. 19B show an embodiment of an aircraft with a system of oppositely rotating cross-flow rotors with a common rotary axis.
Figure 19A:
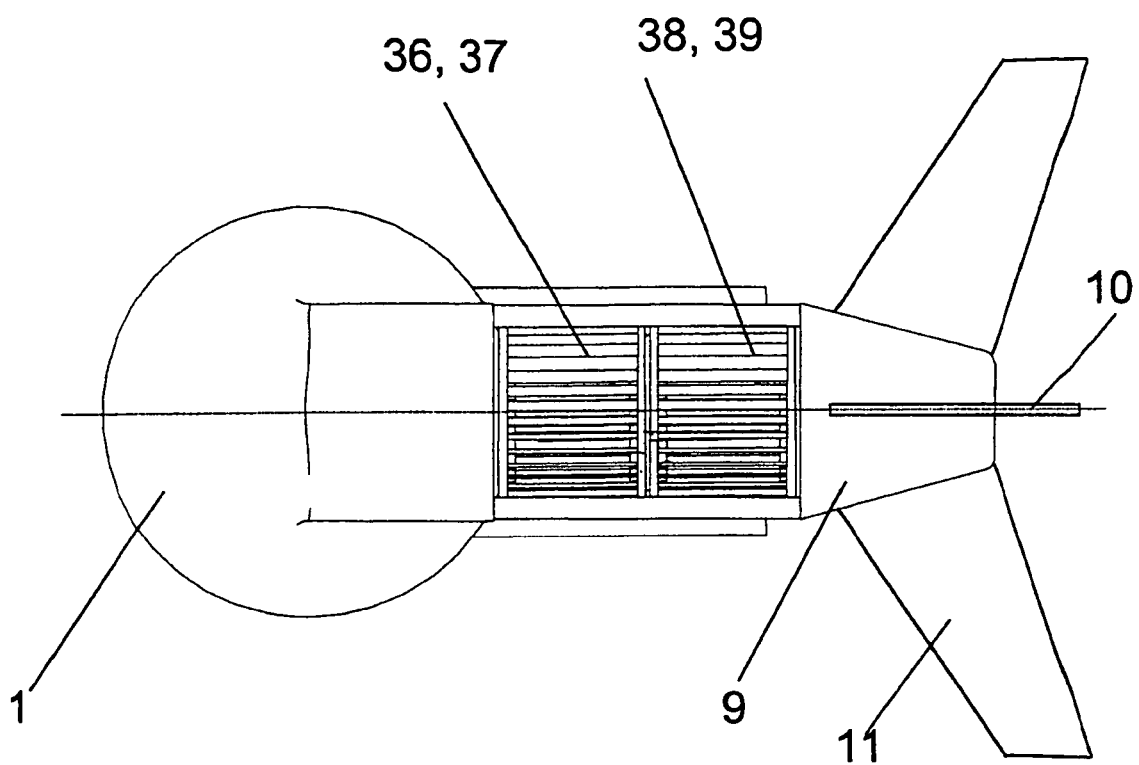
Figure 19B:
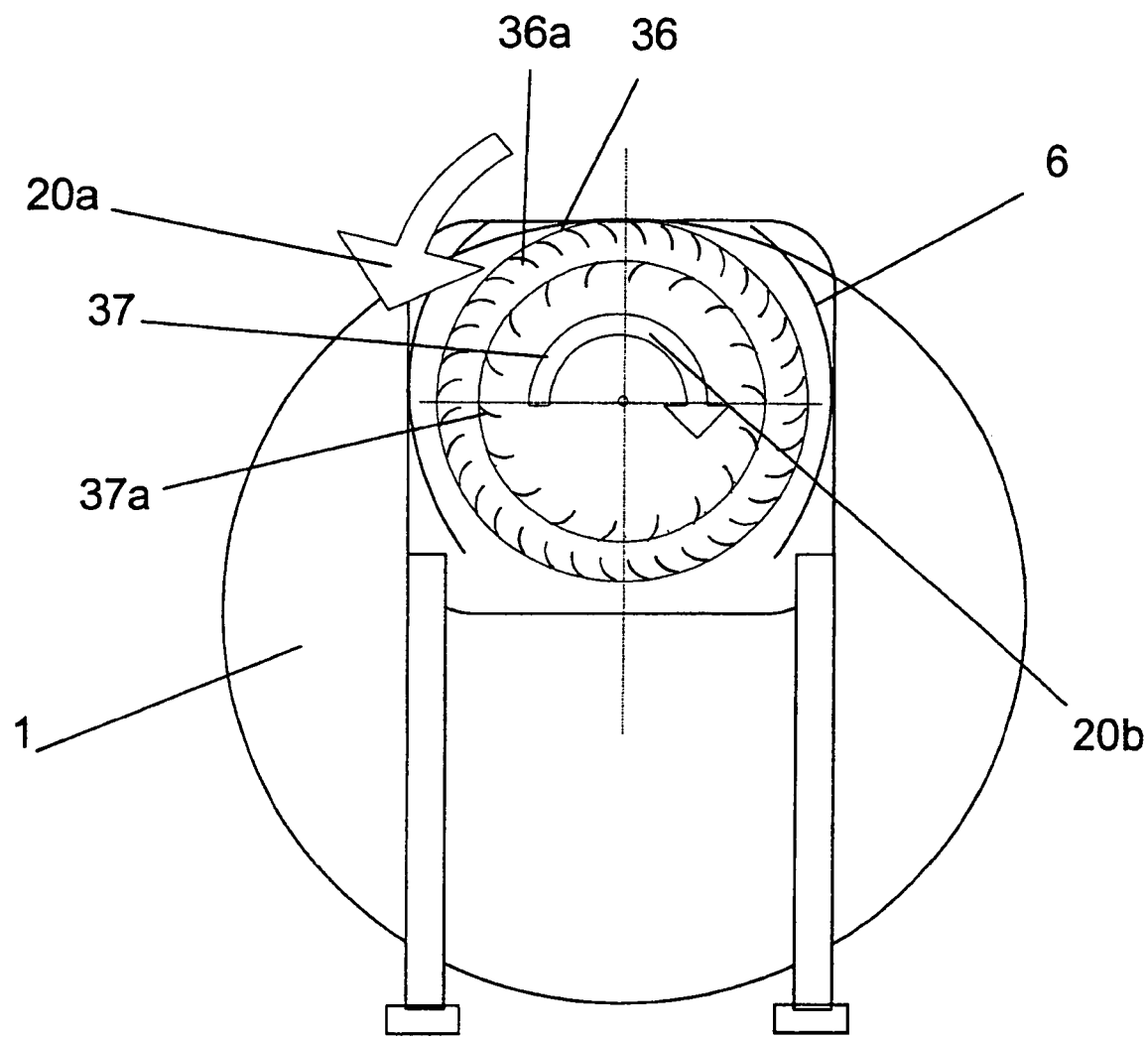

FIG. 19 shows a further embodiment of an aircraft which is suitable for vertical take-off and landing, provided with lifting bodies 36, 37, 38, 39 however which are arranged as cross-flow rotors. FIG. 19A shows the top view of such an aircraft and FIG. 19B shows a representation according to sectional view I-I of FIG. 19. In this embodiment so-called cross-flow rotors are in use which are provided with external flow guide devices 6 which are arranged in a respectively adjustable way and thus allow achieving a virtually unlimited maneuverability (forward movement, backward movement, transversal movement, rotary movement about the vertical axis). These lifting bodies 36, 37, 38, 39, which are configured as cross-flow rotors, each consist of two round end disks which carry a plurality of rotor wings 36a, 37a and rotate about a rotary axis. In a preferred embodiment, an inner cross-flow rotor 37 with opposite direction of rotation is inserted in an external cross-flow rotor 36 each for increasing the flow efficiency.

Figure 20:
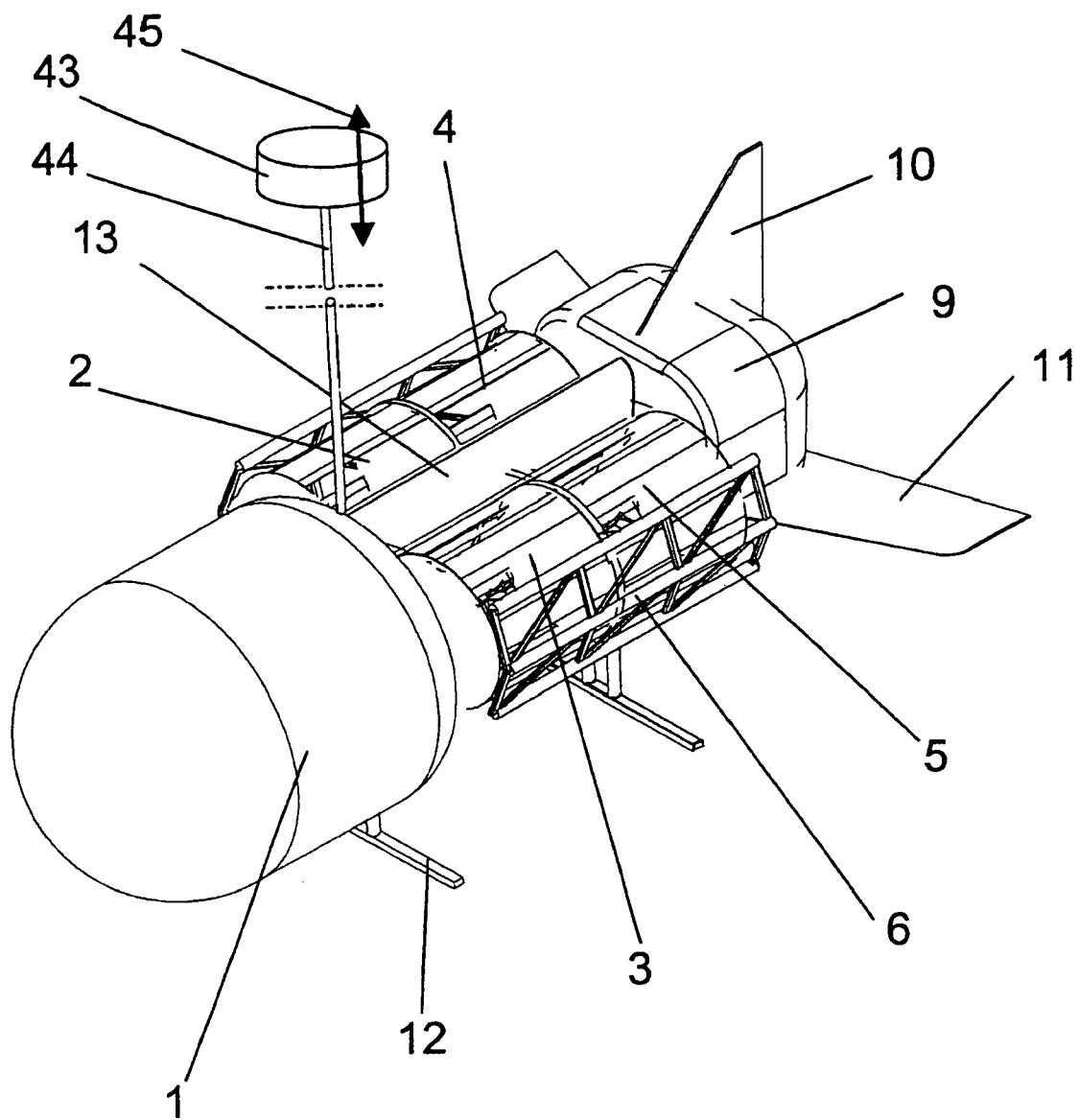
FIG. 20 shows a schematic view of an aircraft in accordance with the invention with an arrangement of a surveillance device which is flexibly linked to the aircraft.

As a result of the fact that there are no rotating units above the aircraft, the pilot can be allowed a safe and secure exit from the aircraft by ejection seat if so required. Moreover, a unit designated as a surveillance device 43 (radar, optical sensor) can be provided in accordance with FIG. 20 above the aircraft, which surveillance device, when the aircraft is in the hovering state, can be brought vertically upwardly by means of a flexible connection 44 and can thereafter be retracted again. This is useful in situations when the aircraft is to be used in military assignments to fly below enemy radar beams behind protective cover in the terrain or in aligned buildings and is to detect the military situation behind a protective terrain formation and, instead of a brief hazardous peek above the terrain, only upwardly extends the surveillance device 43 in a vertical direction, surveys the military situation and thereafter retracts the surveillance device again with the flexible connection securely into the fuselage of the aircraft.

Figure 21:
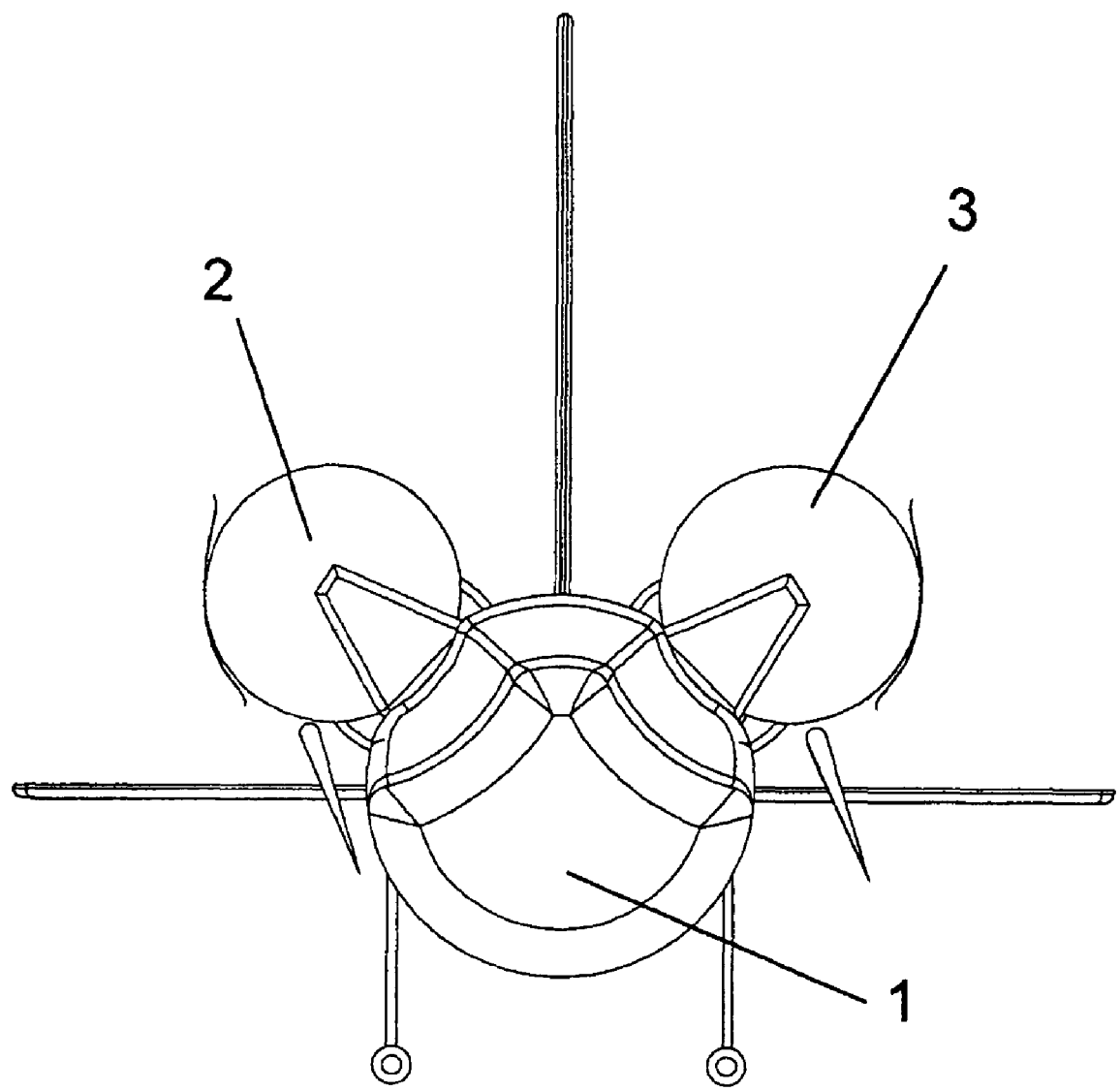
FIG. 21 shows a further embodiment of the invention in a representation from the front.

The aircraft of FIG. 21 consists of a fuselage 1 with a longitudinal axis 1a and two cross-flow rotors 2 and 3 which are arranged above said longitudinal axis 1a. In the rear section of the fuselage there are in the known manner a horizontal tail unit 11 and a rudder unit 10. Skids 46 support the aircraft on the ground. Two by-pass propulsive units 47 are provided behind the cross-flow rotors 2, 3 in the region of the tailplane 4, 5 in order to produce the respective thrust.

Figure 22:
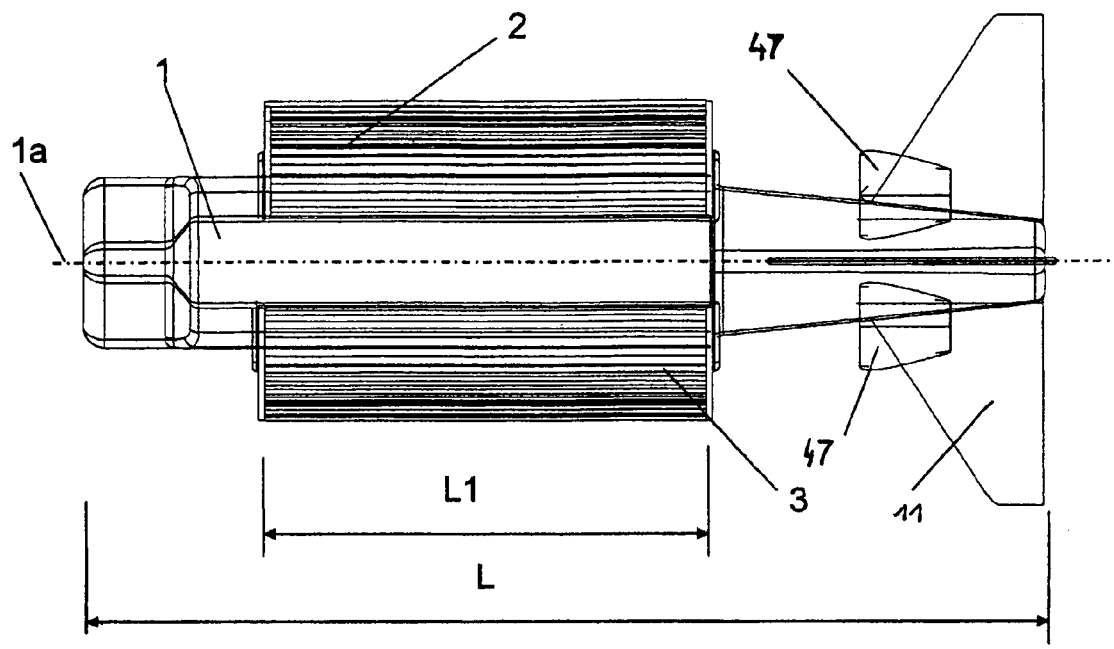
FIG. 22 shows the embodiment of FIG. 21 from above.
Figure 23:
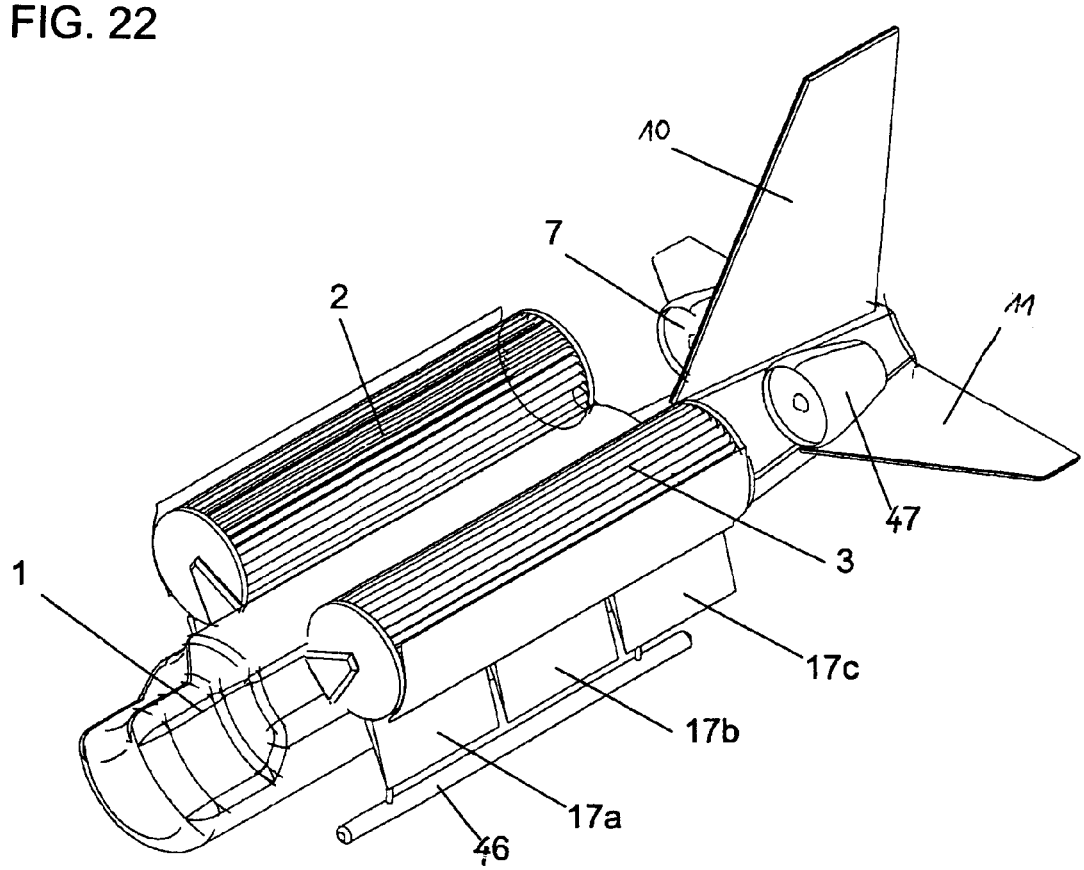
FIG. 23 shows the embodiment of FIG. 21 in an axonometric view.

FIG. 22 shows that the length L1 of the cross-flow rotors 2, 3 corresponds to approximately 50% of the length L of the entire aircraft.

Figure 25:
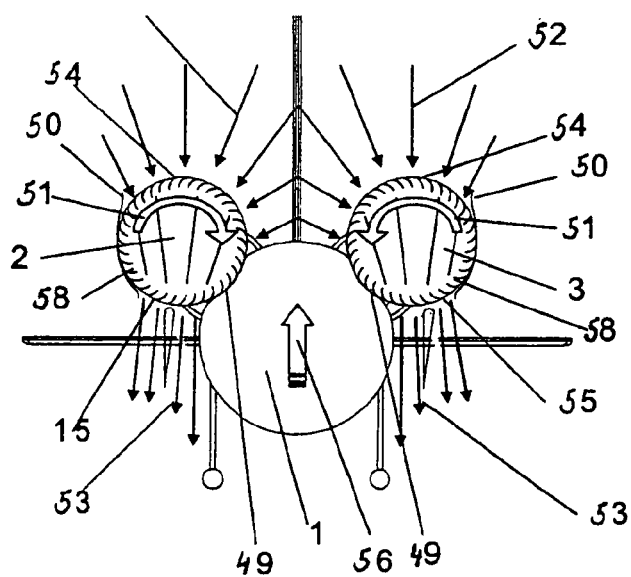
FIG. 25 shows the embodiment of FIG. 24 from the front.

FIG. 25 shows the structure of the aircraft on an enlarged scale in a sectional view. The rotors 2, 3 comprise a plurality of blades 8 which are arranged along the circumference. The rotors 2, 3 are each covered on the circumference by a first guide surface 49 and a second guide surface 50. The first guide surface 49 is configured as a part of the outside surface of the fuselage 1, whereas the second guide surface 50 is configured as a flow guide plate. As a result of the rotation of the cross-flow rotors 2, 3 along the arrows 51, an air flow is induced so that the air is taken in along the arrows 52 and is ejected in the direction of the arrows 53. The upper open region of the rotors 2, 3 is thus used as an air intake opening 54, and the lower open region is used as an air outlet opening 55. The impulse of the downwardly ejected air quantities leads in total to a lifting force for the aircraft, which is represented by arrow 56 and which is sufficient, in the case of a respective configuration, to lift the aircraft from the ground.

Figure 6:
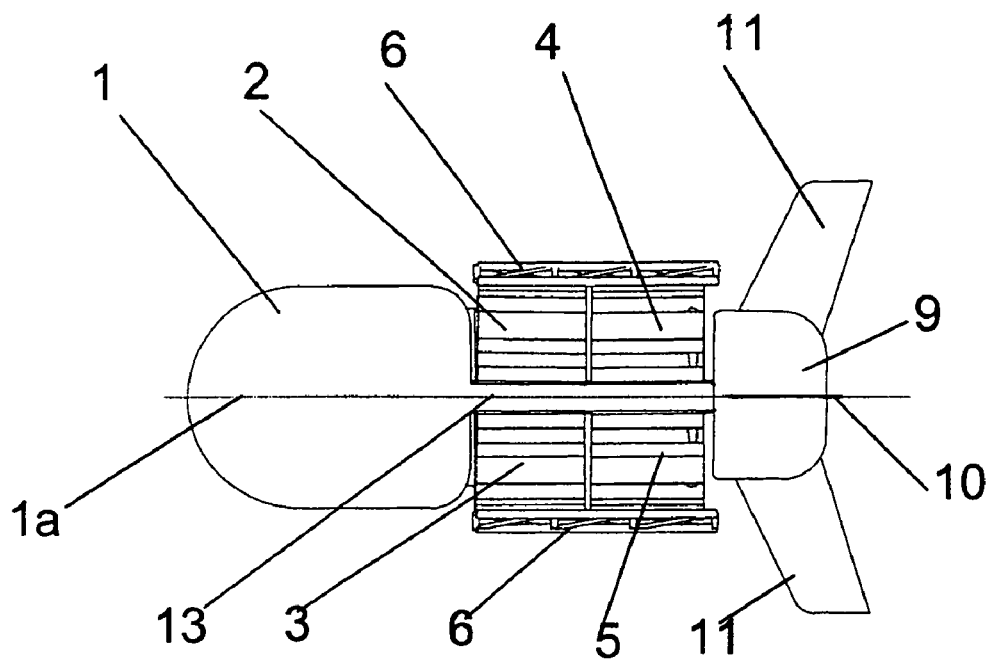
FIG. 6 shows a view of the aircraft of FIG. 1 from above.
Figure 24:
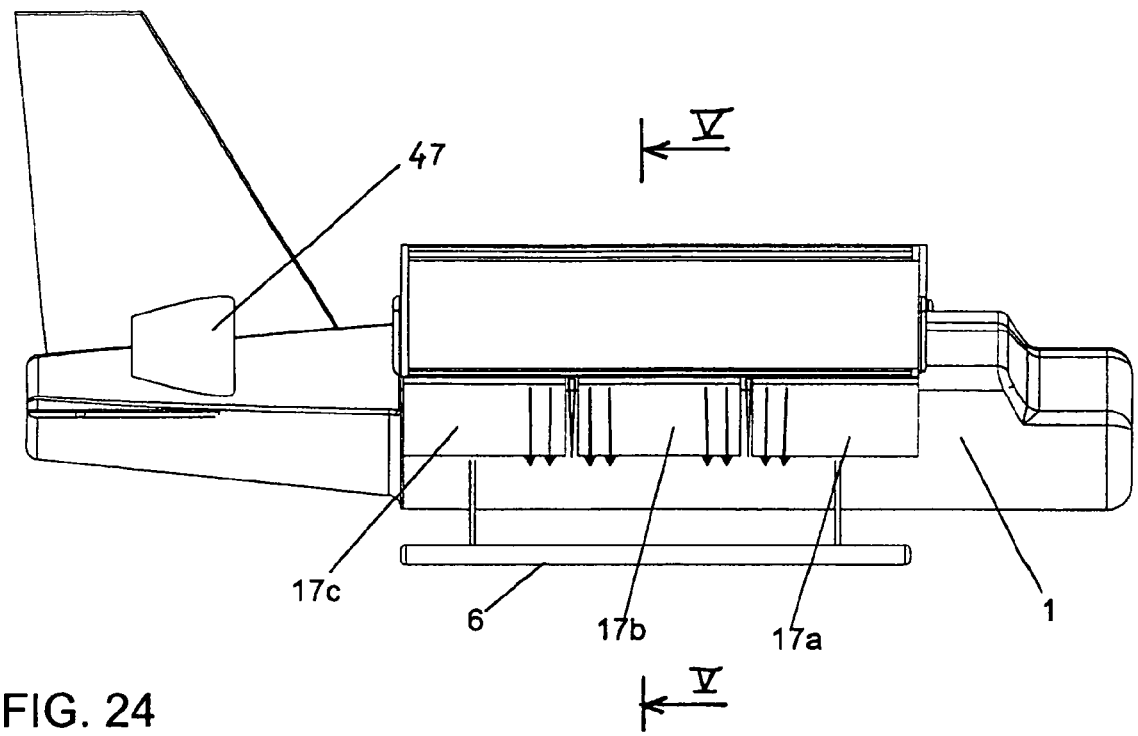
FIG. 24 shows a further embodiment of the invention in a side view.

Adjustable guide blades 17 are provided below the rotors 2, 3, which in the embodiments of FIG. 24 consist of several segments 17a, 17B, 17c which can be pivoted independent from each other about an axis parallel to the longitudinal axis of the aircraft. As a result, a rotation of the aircraft about a vertical axis 1b can be effected by the guide blades 17. It can be seen that the guide blades 17 which are arranged below the air outlet openings are able to change the direction of the air jets along the arrows 53. In the position as shown in FIG. 6, a force component to backboard is generated by pivoting the movable guide blades 17, which is indicated by the arrow 56. Guide blades 58 can be used within the cross-flow rotors for improved guidance of the air flow. The guide blades 58 can be provided with a movable configuration, which improves the maneuverability at high efficiency.

The drive of the cross-flow rotors 2, 3 can occur in principle by piston engines, but is preferably carried out by gas turbines, which is not shown in the drawings.

Figure 26:
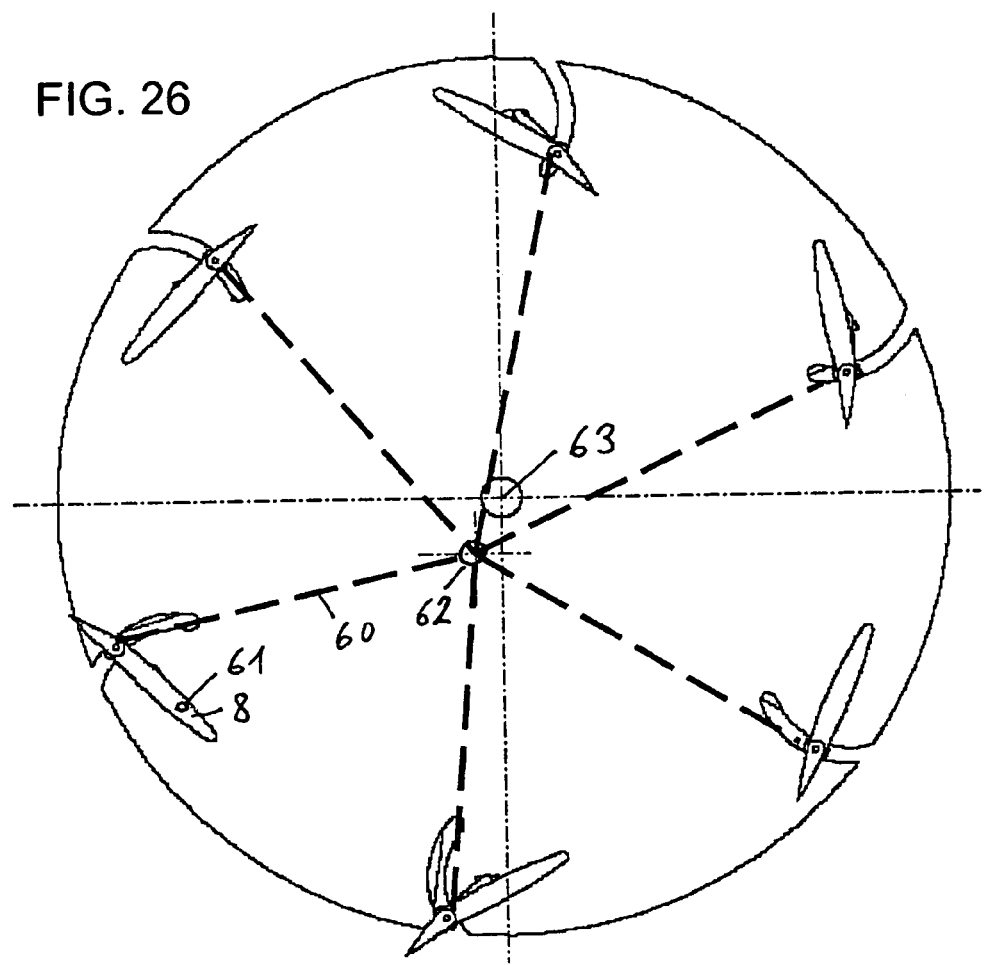
FIG. 26 shows a schematic representation to explain how the rotor blades are triggered.

FIG. 26 shows that the individual rotor blades 8 are arranged in a pivoting way about a pivot 61 via a tow-bar. The tow-bars 60 are held in a common star point 62 which can be displaced relative to the axis 63 at will. An overall flow in any direction can thus be set. The rotor blades 8 are guided in pins 64 in connecting links 65 in order to guarantee respective stability.

Figure 27:
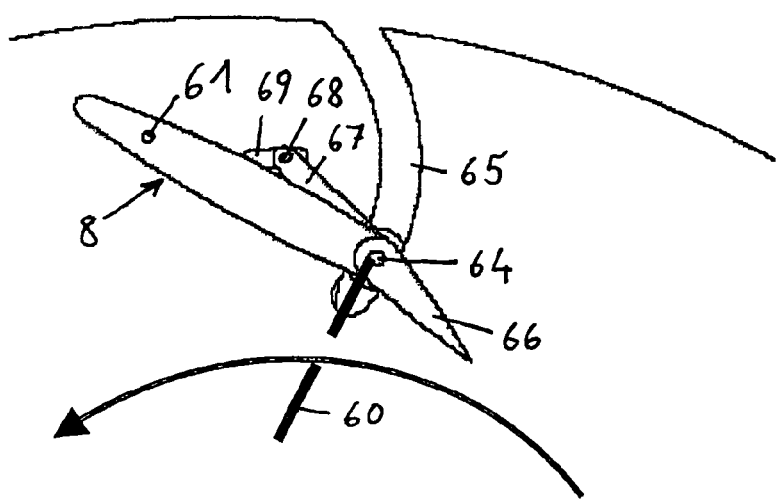
FIG. 27 shows a detail of FIG. 26.

FIG. 27 shows that an end region 66 of the rotor blade 8 is separately adjustable. A lever 67 connected with the end region 66 comprises a pin 68 which is guided in a second connecting link 69, so that the rotor blade 8 assumes an asymmetric airfoil profile, which increases the conveying output and the efficiency. The stronger the incidence of the rotor blade 8, the stronger the additional incidence of the end region 66 and thus the overall profiling of the rotor blade 8.

The present invention describes an aircraft which offers the possibility of vertical take-off and vertical landing, allows a virtually unlimited maneuverability in the hovering state, offers a high cruising speed with simultaneous fuel economy, al-lows the pilot a secure exit from the aircraft if required, and houses a flexibly arranged surveillance device above the aircraft.

I claim:

1. An aircraft comprising a fuselage and at least two substantially hollow cylindrical lifting bodies which are applied to the fuselage and include a plurality of rotor blades which extend over the periphery of the lifting bodies, with the periphery of the lifting bodies being partially covered by at least one guide surface, said lifting bodies being driven by at least one drive unit and each having a cylinder axis substantially parallel to a longitudinal axis of the aircraft, said rotor blades having an airfoil configuration with front parts and rear parts, and wherein said rear parts are movable about a swiveling axis independently of said front parts, wherein said guide surface is formed at least partly by an external surface of the fuselage.

2. The aircraft according to claim 1, wherein said at least one guide surface includes at least a first guide surface and a second guide surface, a region extending from said first guide surface to said second guide surface forms an air intake opening, another region extending from said first guide surface to said second guide surface forms an air outlet opening, and said plurality of rotor blades are at least partially covered by said first guide surface and said second guide surface.

3. The aircraft according to claim 1, wherein said rotor blades are movably mounted and arranged so as to be swivellable about their longitudinal axis.

4. The aircraft according to claim 1, wherein the lifting bodies are arranged above the center-of-gravity position of the aircraft.

5. The aircraft according to claim 1, wherein the lifting bodies are provided with a hollow-cylindrical configuration and rotate in opposite directions.

6. The aircraft according to claim 1, wherein the lifting bodies are driven in opposite directions by gas turbines mechanically connected to said lifting bodies.

7. The aircraft according to claim 1, wherein additional propulsive units are provided for a high cruising speed.

8. The aircraft according to claim 7, wherein the additional propulsive units are provided with a pivoting configuration in order to enable additional support during take-off, landing and other maneuvers.

9. The aircraft according to claim 1, wherein the aircraft is configured with two lifting bodies which are arranged behind one another along the longitudinal axis of the aircraft and rotate in opposite directions.

10. The aircraft according to claim 1, wherein the aircraft is configured with two lifting bodies whose central axes are situated parallel next to each other.

11. The aircraft according to claim 1, wherein the aircraft is configured with four lifting bodies, with two lifting bodies each rotating in opposite directions and being arranged parallel with respect to each other.

12. The aircraft according to claim 1, wherein at least one guide blade each is provided in the interior of the lifting bodies.

13. The aircraft according to claim 12, wherein the guide blades in the interior of the rotors are provided with an adjustable configuration.

14. The aircraft according to claim 1, wherein adjustable guide blades are provided in the region of the air outlet openings.

15. The aircraft according to claim 14, wherein the adjustable guide blades consist of two, preferably three segments in order to enable a rotation about a vertical axis.

16. The aircraft according to claim 1, wherein the lifting bodies extend over at least 40%, preferably over at least 70% of the length of the fuselage.

17. The aircraft according to claim 1, wherein further adjustable guide blades are provided which allow a forward and rearward movement in the hovering state.

18. The aircraft according to claim 1, wherein a second tail surface of the lifting bodies is disposed to form a mechanical protection means for the rotor blades against a collision with a solid obstruction.

19. The aircraft according to claim 1, wherein the rotor blades of the individual lifting bodies are individually adjustable in order to enable the generation of lifting and lateral forces and in order to enable the compensation of different center-of-gravity positions.

20. The aircraft according to claim 1, wherein the lifting bodies are provided with coverings configured as compact covers or a system of lamellae, and the coverings ensure an unhindered passage of air and reduce flow losses for a high cruising speed where the efficiency of the lifting bodies is reduced.

21. The aircraft according to claim 1, wherein the lifting bodies are provided on the side with a protective covering which allows an unobstructed passage of air in a longitudinal direction, but if necessary will protect the rotating lifting bodies against collision with a solid obstruction.

22. The aircraft according to claim 1, wherein the lifting body substantially consists of a rotary shaft, two end disks and rotor blades.

23. The aircraft according to claim 1, wherein there are no rotating units above the aircraft, so that the pilot can be allowed a safe exit from the aircraft by ejection seat if so required, or a special surveillance device can be extended vertically upwardly and can be retracted again.

24. The aircraft according to claim 1, wherein at least one lifting body is configured as a cross-flow rotor.

* * * * *